US011226393B2

(12) United States Patent
Carter et al.

(10) Patent No.: US 11,226,393 B2
(45) Date of Patent: Jan. 18, 2022

(54) LOCATOR DEVICE FOR PROVIDING A POSITION DATA TO A MOBILE DEVICE

(71) Applicants: Patrick L. Carter, Lone tree, CO (US); Laura M. Rangel, Rancho Palos Verdes, CA (US)

(72) Inventors: Patrick L. Carter, Lone tree, CO (US); Laura M. Rangel, Rancho Palos Verdes, CA (US)

(73) Assignee: INTERNATIONAL FORTE GROUP LLC, Westport, CT (US)

(*) Notice: Subject to any disclaimer, the term of this patent is extended or adjusted under 35 U.S.C. 154(b) by 0 days.

(21) Appl. No.: 17/001,383

(22) Filed: Aug. 24, 2020

(65) Prior Publication Data

US 2021/0055371 A1 Feb. 25, 2021

Related U.S. Application Data

(60) Provisional application No. 62/890,289, filed on Aug. 22, 2019.

(51) Int. Cl.
| | | |
|---|---|---|
| *G01S 5/02* | (2010.01) | |
| *G01S 19/49* | (2010.01) | |
| *H04W 4/80* | (2018.01) | |
| *H04W 4/029* | (2018.01) | |
| *H01Q 5/25* | (2015.01) | |

(52) U.S. Cl.
CPC .......... *G01S 5/0289* (2013.01); *G01S 5/0218* (2020.05); *G01S 19/49* (2013.01); *H01Q 5/25* (2015.01); *H04W 4/029* (2018.02); *H04W 4/80* (2018.02)

(58) Field of Classification Search
CPC ...... G01S 5/0289; G01S 5/0218; G01S 19/49; H01Q 5/25; H04W 4/029; H04W 4/80
USPC ....... 455/456.1, 404.2, 41.1, 41.2, 418, 421, 455/422.1
See application file for complete search history.

(56) References Cited

U.S. PATENT DOCUMENTS

| | | | | |
|---|---|---|---|---|
| 8,620,339 | B2* | 12/2013 | McCormick .......... | H04W 24/10 455/452.2 |
| 8,670,781 | B2* | 3/2014 | Kim .................... | G01C 21/3438 455/456.1 |
| 10,608,731 | B2* | 3/2020 | Saito ...................... | H04B 7/155 |
| 2018/0164801 | A1* | 6/2018 | Kim .................. | H04M 1/72415 |

* cited by examiner

*Primary Examiner* — Nghi H Ly
(74) *Attorney, Agent, or Firm* — Dhiraj Jindal; Patent Yogi LLC

(57) ABSTRACT

Disclosed is a first locator device for providing a position data to a mobile device. The first locator device may include a first communication transceiver configured to transmit an outgoing data to the mobile device and receive an incoming data from the mobile device. Further, the first locator device may include a first location transceiver. Further, the first location transceiver may include a first array of antennae, a first plurality of location receivers, a first plurality of location transmitters, a first orientation sensor configured to generate a first orientation data corresponding to the first locator device, a first location processor communicatively coupled to each of the first plurality of location receivers, the first plurality of location transceivers and the first orientation sensor. Further, the first locator device may include a first power source to provide electrical energy to each of the first communication transceiver and the first location transceiver.

22 Claims, 21 Drawing Sheets

LOCATOR DEVICE FOR PROVIDING A POSITION DATA TO A MOBILE DEVICE

The current application claims a priority to the U.S. Provisional Patent application Ser. No. 62/890,289 filed on Aug. 22, 2019, titled "System and Method for High-Precision, Mobile-to-Mobile Device Tracking and Social Interaction Augmentation", the contents of which is incorporated herein by reference in its entirety.

TECHNICAL FIELD

Generally, the present disclosure relates to the field of data processing. More specifically, the present disclosure relates to a locator device for providing a position data to another locator device or a mobile device.

BACKGROUND

Location-based services (LBSs) have become very popular with the rising popularity of smartphones across the world. For example, LBSs include navigation software, social networking services, location-based advertising, and tracking system. The LBSs were developed by integrating data from satellite navigation systems, cellular networks, and mobile computing, to provide services based on the geographical locations of users. Further, LBSs use Global Positioning Systems to determine the location of users.

However, it is challenging to find the accurate location of users as regular GPS cannot pinpoint locations to greater than 3-m accuracy and is dependent on external network infrastructure like GPS satellite reception or beacons. Many LBSs require a higher level of accuracy than available in conventional systems.

Therefore, there is a need for an improved locator device for providing accurate position data to a mobile device or a locator device on a peer-to-peer basis that may overcome one or more of the above-mentioned problems and/or limitations.

BRIEF SUMMARY

This summary is provided to introduce a selection of concepts, in a simplified form, that are further described below in the Detailed Description. This summary is not intended to identify key features or essential features of the claimed subject matter. Nor is this summary intended to be used to limit the claimed subject matter's scope.

Disclosed is a first locator device for providing a position data to a mobile device. The first locator device may include a first communication transceiver configured to transmit an outgoing data to the mobile device and receive an incoming data from the mobile device. Further, the outgoing data may include the position data. Further, the first locator device may include a first location transceiver. Further, the first location transceiver may include a first array of antennae configured to intercept incoming radio frequency waves transmitted by at least one second locator device and emanate outgoing radio frequency waves based on plurality of outgoing radio frequency signal data. Further, the first location transceiver may include a first plurality of location receivers electrically coupled to the first array of antennae. Further, the first plurality of location receivers may be configured to generate a plurality of incoming radio frequency signal data based on interception of the radio frequency waves.

Further, the first location transceiver may include a first plurality of location transmitters electrically coupled to the first array of antennae. Further, the first plurality of location transmitters may be configured to generate the plurality of outgoing radio frequency signal data. Further, the first location transceiver may include a first orientation sensor configured to generate a first orientation data corresponding to the first locator device. Further, the first location transceiver may include a first location processor communicatively coupled to each of the first plurality of location receivers, the first plurality of location transceivers and the first orientation sensor. Further, the first location processor may be configured to generate the plurality of outgoing radio frequency signal data and generate the position data based on the plurality of incoming radio frequency signal data and the orientation data. Further, the position data may be in relation to the at least one second locator device. Further, the first locator device may include a first power source to provide electrical energy to each of the first communication transceiver and the first location transceiver.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
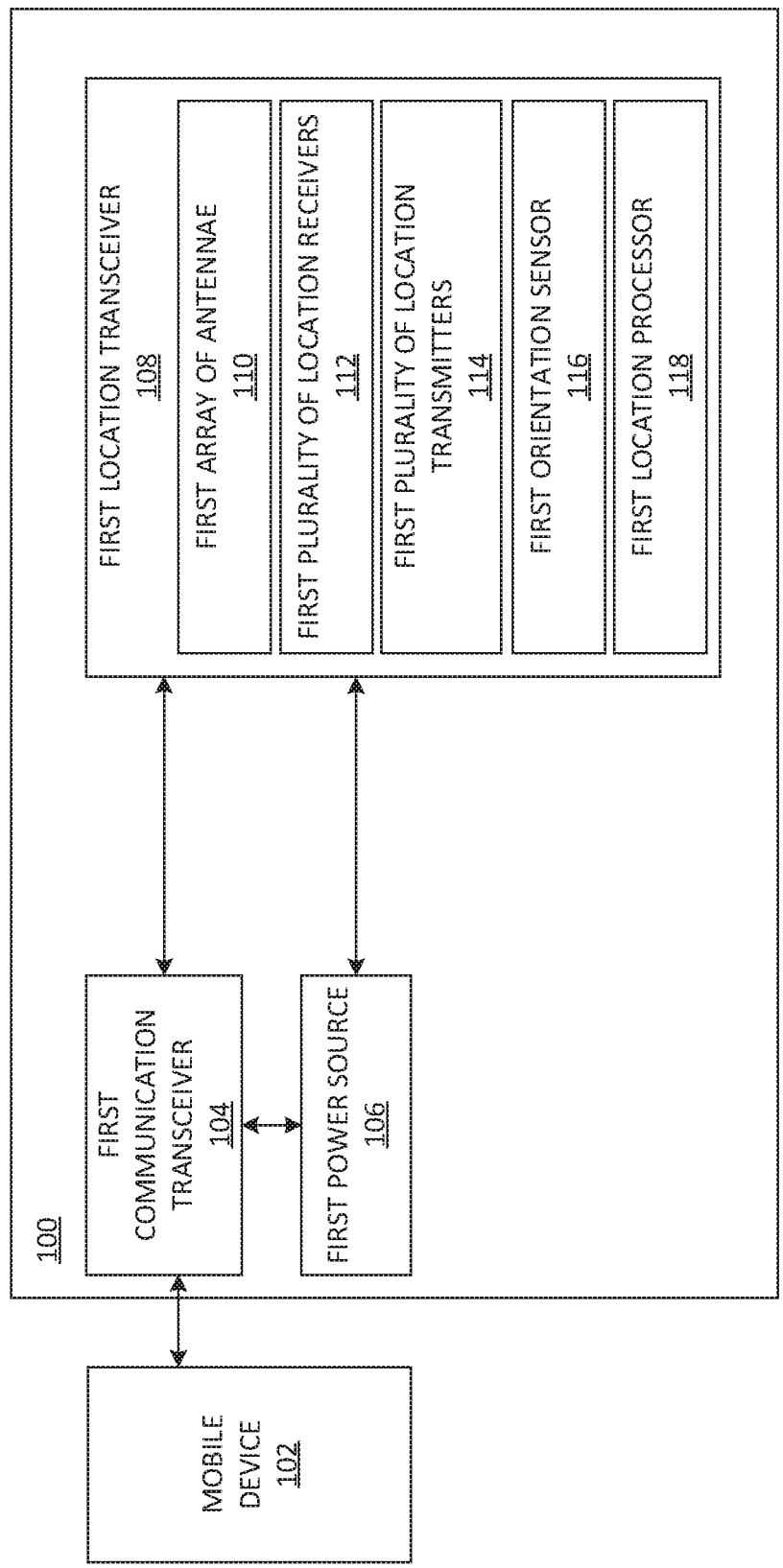
FIG. 1. is a block diagram of a first locator device for providing a position data to a mobile device, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a locator device for providing a position data to a mobile device, embodiments of the present disclosure are not limited to use only in this context.

In general, the methods disclosed herein may be performed by one or more computing devices. For example, in some embodiments, the methods may be performed by a server computer in communication with one or more client devices over a communication network such as, for example, the Internet. In some other embodiments, the methods may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a supercomputer, a mainframe computer, mini-computer, microcomputer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the methods disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the methods may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the methods may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the methods may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device.

Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the methods may be performed at one or more spatial locations. For instance, the methods may be performed by a plurality of devices interconnected through a communication network. Accordingly, in an example, one or more steps of the methods may be performed by a server computer. Similarly, one or more steps of the methods may be performed by a client computer. Likewise, one or more steps of the methods may be performed by an intermediate entity such as, for example, a proxy server. For instance, one or more steps of the methods may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the methods operating on the sensitive data and/or a derivative thereof may be performed at the client device.

FIG. 1. is a block diagram of a first locator device 100 for providing a position data to a mobile device 102, in accordance with some embodiments. In some embodiments, the position data may include a 2D position data or a 3D position data. Further, the first locator device 100 may include one or more of an accelerometer, a gyroscope, and a magnetometer.

The first locator device 100 may include a first communication transceiver 104 configured to transmit an outgoing data to the mobile device 102 and receive an incoming data from the mobile device 102. Further, the outgoing data may include the position data.

According to some embodiments, the first communication transceiver 104 may include a short range communication transceiver. According to further embodiments, the short range communication transceiver may be configured to operate in accordance with a Bluetooth standard. According to further embodiments, the short range communication transceiver may include a Near-Field-Communication (NFC) transceiver.

Further, the first locator device 100 may include a first power source 106 to provide electrical energy to each of the first communication transceiver 104 and a first location transceiver 108.

Further, the first locator device 100 may include the first location transceiver 108. Further, the first location transceiver 108 may include a first array of antennae 110 configured to intercept incoming radio frequency waves transmitted by at least one second locator device and emanate outgoing radio frequency waves based on plurality of outgoing radio frequency signal data.

Further, the first location transceiver 108 may include a first plurality of location receivers 112 electrically coupled to the first array of antennae 110. Further, the first plurality of location receivers 112 may be configured to generate a plurality of incoming radio frequency signal data based on interception of the radio frequency waves.

Further, the first location transceiver 108 may include a first plurality of location transmitters 114 electrically coupled to the first array of antennae 110. Further, the first plurality of location transmitters 114 may be configured to generate the plurality of outgoing radio frequency signal data.

Further, the first location transceiver 108 may include a first orientation sensor 116 configured to generate a first orientation data corresponding to the first locator device 100.

Further, the first location transceiver 108 may include a first location processor 118 communicatively coupled to each of the first plurality of location receivers 112, the first plurality of location transceivers and the first orientation sensor 116.

According to some embodiments, the first location processor 118 may be configured to generate the position data based on at least one of triangulation and trilateration of the plurality of incoming radio frequency signal data.

According to some embodiments, the first location processor 118 may be configured to generate the position data based on at least one of Time Difference of Arrival (TDoA) and Phase Difference of Arrival (PDoA) corresponding to the plurality of incoming radio frequency signal data.

Further, the first location processor 118 may be configured to generate the plurality of outgoing radio frequency signal data and generate the position data based on the plurality of incoming radio frequency signal data and the orientation data. Further, the position data may be in relation to the at least one second locator device.

According to some embodiments, the first location transceiver 108 may include a short range communication transceiver. Further, the short range communication may be configured to operate in accordance with Bluetooth standard v5.1.

According to some embodiments, the first location transceiver 108 may include a first Ultra-Wideband (UWB) transceiver. Further, the first array of antennae 110 may include a plurality of UWB antennae and the first plurality of location receivers 112 comprises a plurality of UWB receivers.

Figure 2:
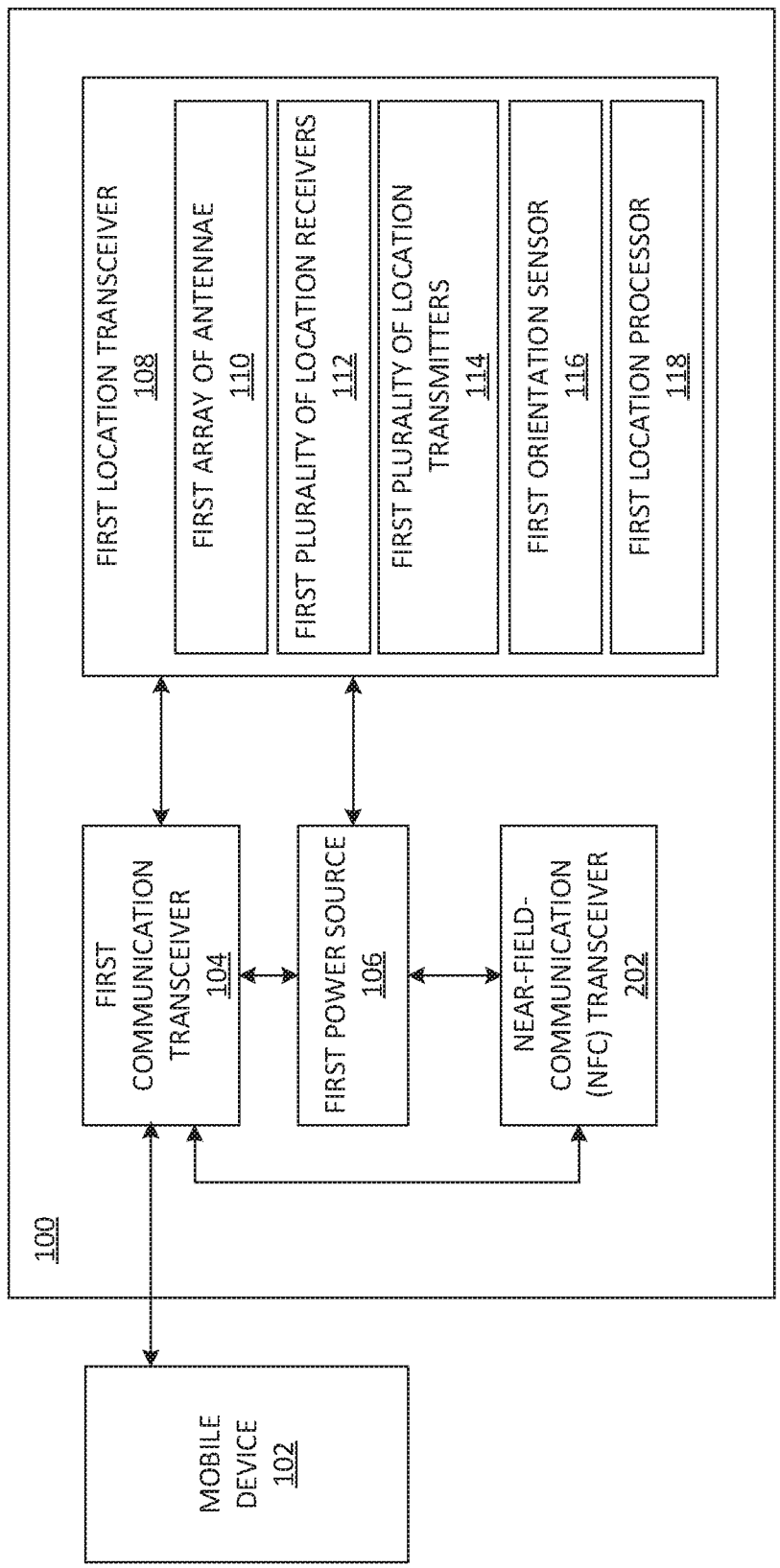
FIG. 2. is a block diagram of the first locator device for providing a position data to a mobile device, in accordance with further embodiments.

FIG. 2. is a block diagram of the first locator device 100 for providing a position data to the mobile device 102, in accordance with further embodiments. The first locator device 100 may include a Near-Field-Communication (NFC) transceiver 202. Further, each of the first communication transceiver 104 and the NFC transceiver 202 may be configured to operate synchronously.

According to some embodiments, the first array of antennae 110 may be disposed in a predetermined spatial arrangement configured to facilitate generation of the position data based on at least one of triangulation and trilateration of the plurality of incoming radio frequency signal data.

According to further embodiments, a first antenna of the first array of antennae 110 may be disposed at a first spatial position in relation to a reference point on the first locator device 100. Further, a second antenna of the first array of the antennae 110 may be disposed at a second spatial position in relation to the reference point. Further, a spatial distance between the first spatial position and the second spatial position may be at least 3 mm. In some embodiments, the distance between the two antennas within a quad unit may be 22 mm.

Figure 3:
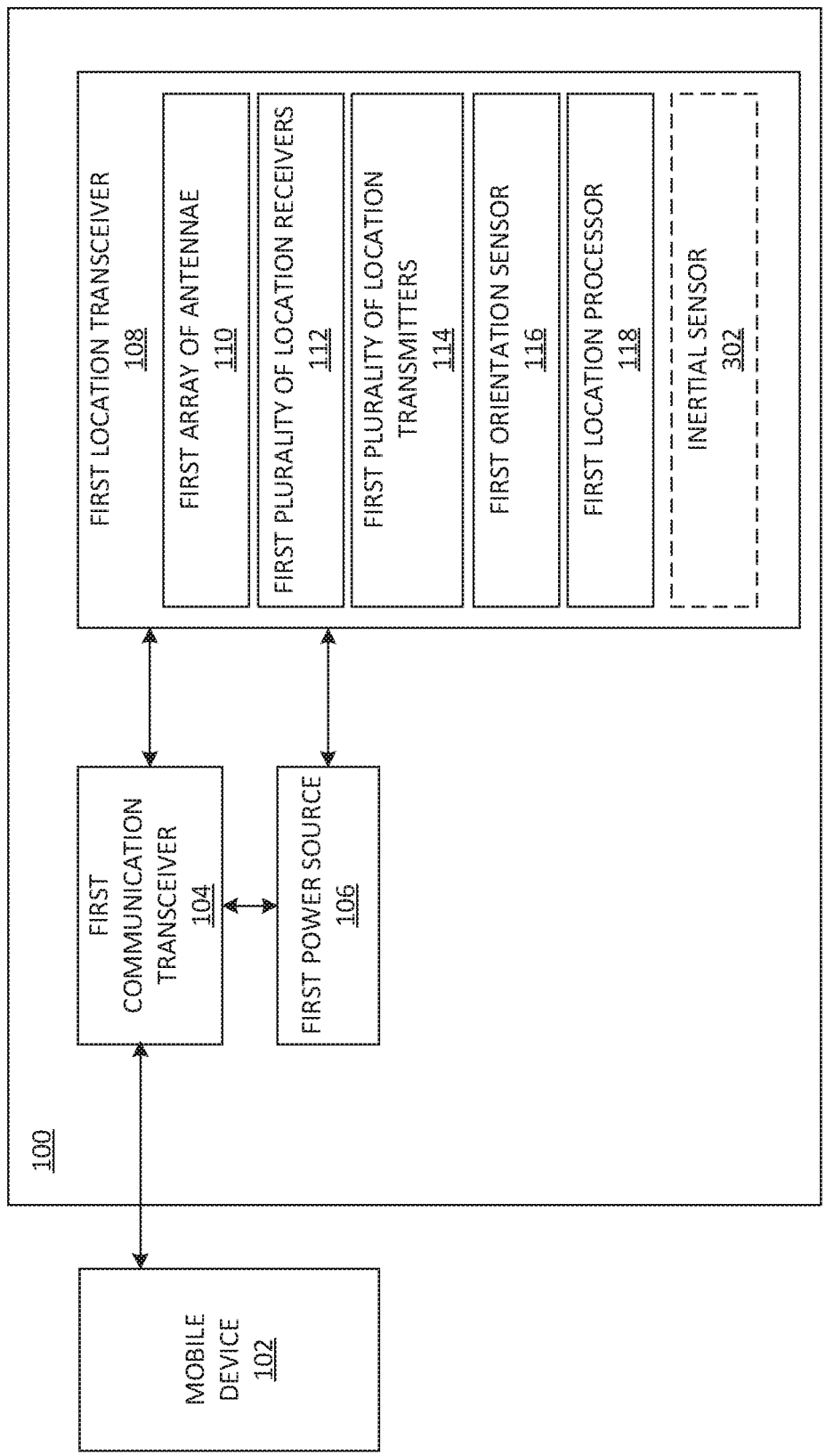
FIG. 3. is a block diagram of the first locator device for providing a position data to a mobile device, in accordance with further embodiments.

According to further embodiments, the first location transceiver 108 may include at least one inertial sensor 302 (as shown in FIG. 3) configured to generate an inertial data based on at least one of a motion and an orientation of the first locator device 100. Further, the at least one inertial sensor 302 may include a motion sensor and an orientation sensor. Further, the inertial data may include at least one of a motion data and an orientation data. Further, the at least one inertial sensor 302 may be communicatively coupled to the first location processor 118. Further, the first location processor 118 may be configured to generate the position data based further on the inertial data.

According to further embodiments, the first location processor 118 may be configured to analyze the inertial data, determine a predetermined movement based on the analysis, and generate an inertial offset data based on determining the predetermined movement. Further, the inertial offset data may include at least one of a motion offset data and an orientation offset data. Further, the generating of the position data is further based on the inertial offset data.

In exemplary embodiments, the first locator device 100 may be worn as a wrist band. Accordingly, as a user wearing the first locator device 100 is walking or running, the location data may fluctuate based on movement of the arm (i.e. the predetermined movement). Accordingly, in order to filter this fluctuation, a motion offset data may be generated and used for generating a stable three-dimensional location data.

Figure 4:
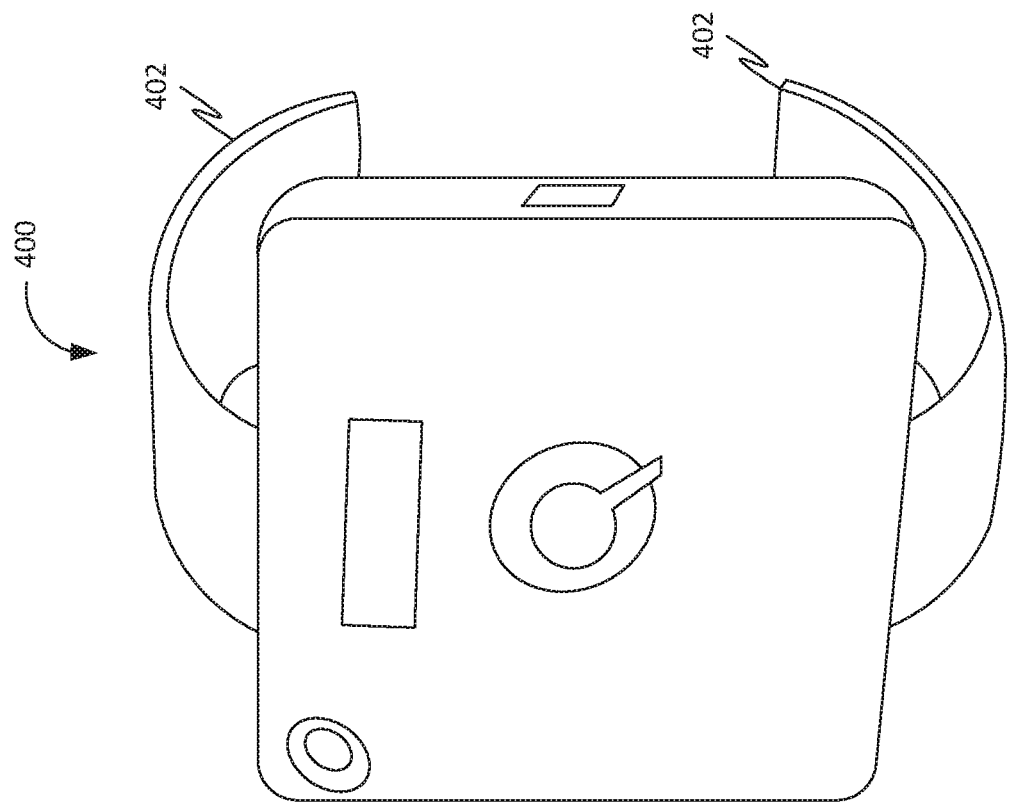
FIG. 4 is a front perspective view of a housing of a first locator device, in accordance with some embodiments.
Figure 5:
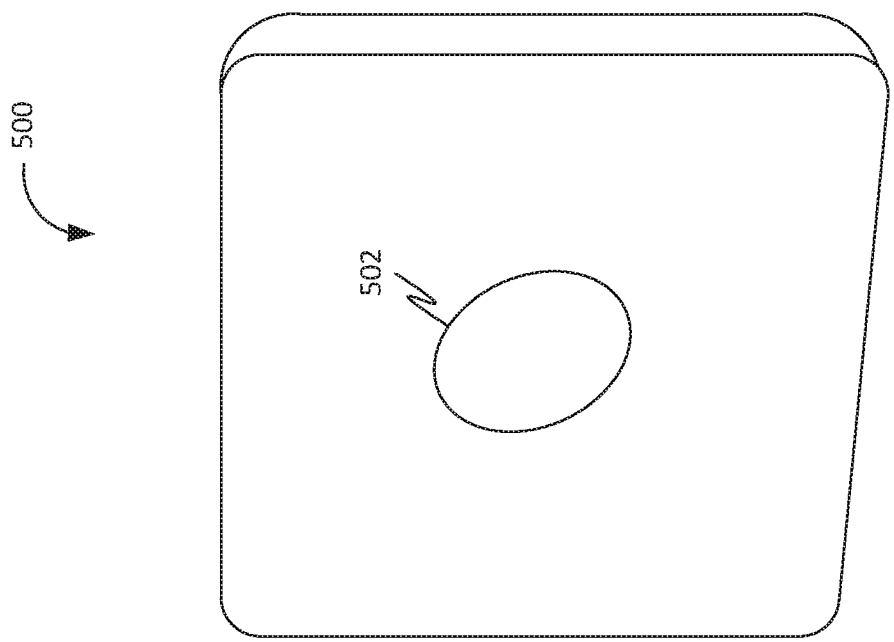
FIG. 5 is a rear perspective view of a housing of a first locator device, in accordance with some embodiments.

According to further embodiments, the first locator device 100 may include a housing 402 (shown in FIG. 4) configured to house each of the first communication transceiver 104, the first location transceiver 108 and the first power source 106. Further, the first locator device 100 may include a fastener 404 (shown in FIG. 4) configured to fasten the first locator device 100 onto a wearable device of a user. Further, the wearable device may include at least one of a wristband, a garment, an accessory, a foot wear, a facemask, headset/headwear, and an eyewear.

According to some embodiments, the first locator device 100 may include a housing 500 configured to house each of the first communication transceiver 104, the first location transceiver 108 and the first power source 106. Further, the housing 500 may be characterized by a cuboidal shape.

Further, the first locator device 100 may include a fastener 502 attached to an exterior surface of the housing 500. Further, the fastener 502 may be configured to fasten the first locator device 100 to a rear surface of the mobile device 102.

According to further embodiments, the fastener 502 may include a magnetic material configured to attract a metallic portion comprised in the mobile device 102.

According to further embodiments, the fastener 502 may include a layer of a releasable adhesive.

According to further embodiments, the fastener 502 may include a double sided adhesive layer. Further, a first side of the double sided adhesive layer may include a first layer of adhesive configured to adhere to the exterior surface of the housing 500. Further, the second side of the double sided adhesive layer may include a second layer of adhesive configured to adhere to the rear surface of the mobile device 102.

Figure 6:
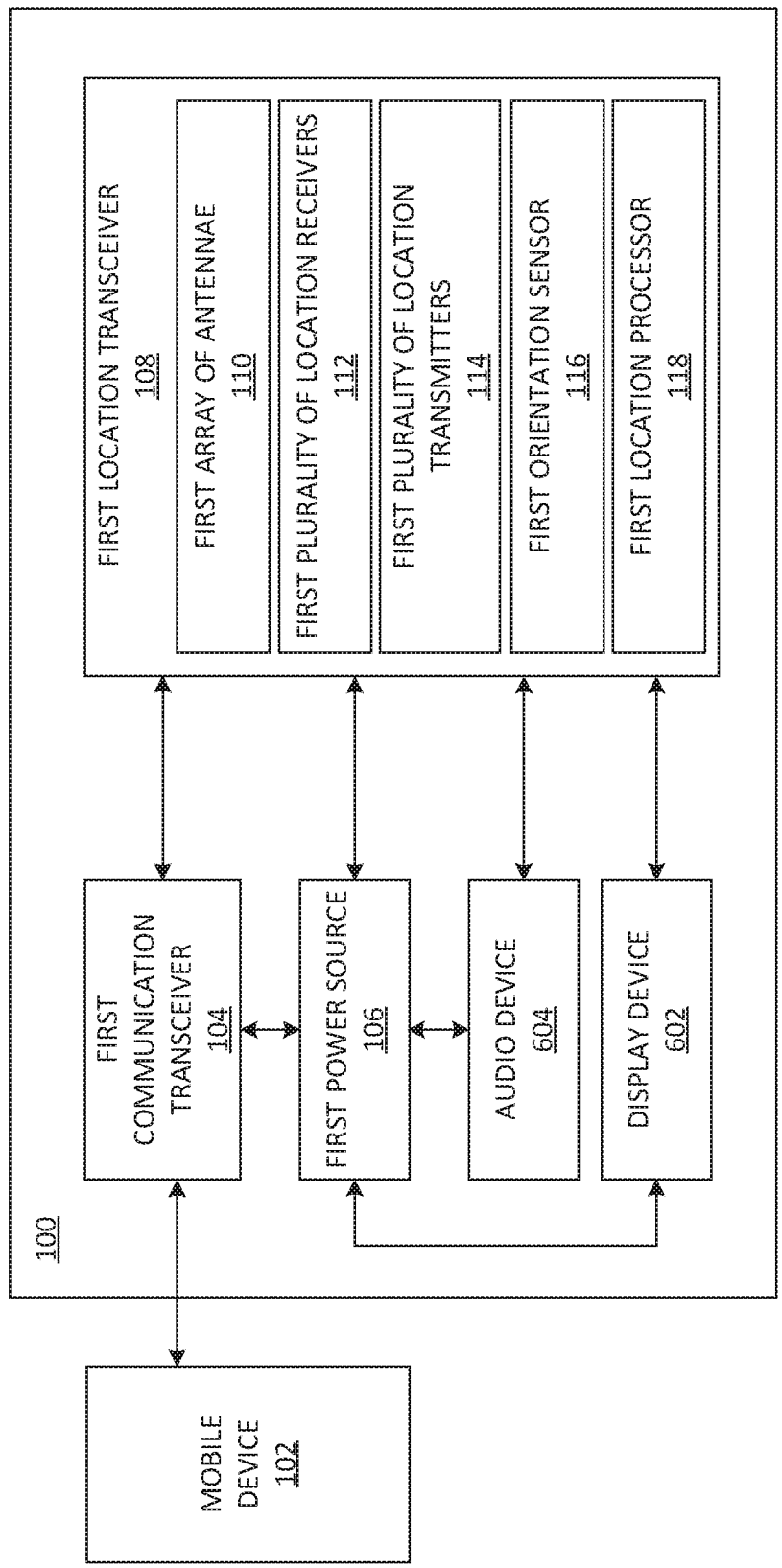
FIG. 6. is a block diagram of the first locator device for providing a position data to a mobile device, in accordance with further embodiments.

FIG. 6. is a block diagram of the first locator device 100 for providing a position data to a mobile device 102, in accordance with further embodiments. The first locator device 100 may include at least one of a display device 602 and an audio device 604. Further, the display device 602 may be configured to generate a visual display based on a display data. Further, the audio device 604 may be configured to generate acoustic waves based on an audio data. Further, at least one of the display device 602 and the audio device 604 may be communicatively coupled to the first location processor 118. Further, the first location processor 118 may be configured to analyze the position data and generate at least one of the display data and the audio data based on analysis of the position data.

Figure 7:
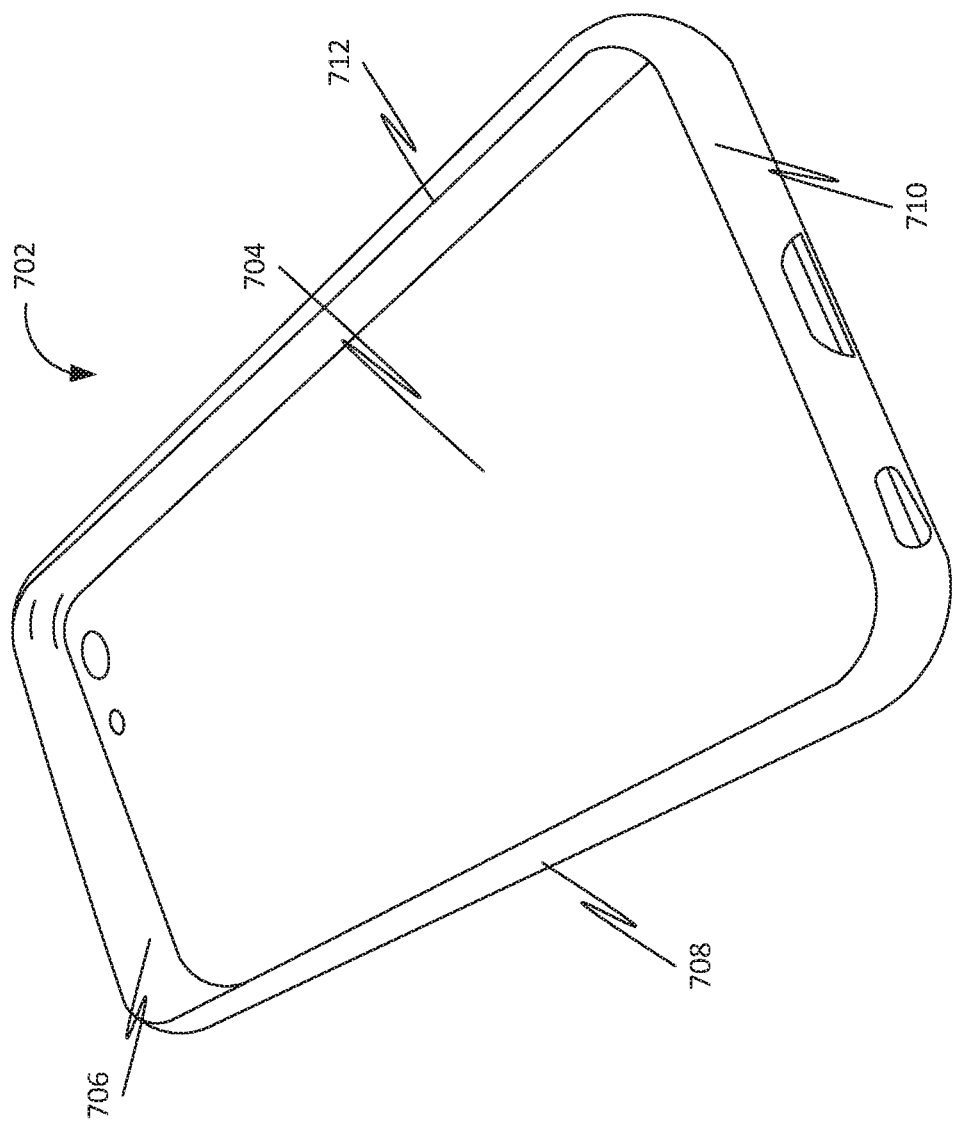
FIG. 7. is a perspective view of a case, in accordance with some embodiments.

FIG. 7. is a perspective view of a case 702, in accordance with some embodiments. Further, the first locator device 100 may include the case 702 characterized according to a form factor of the mobile device 102. Further, the case 702 may be configured to be secured onto the mobile device 102. Further, the case 702 may include a back panel 704 comprising an exterior side and an interior side and at least three side panels 706-712. Further, each side panel may be attached to a boundary of the back panel 704 and extends away from the interior side forming a cavity configured to receive the mobile device 102.

Figure 8:
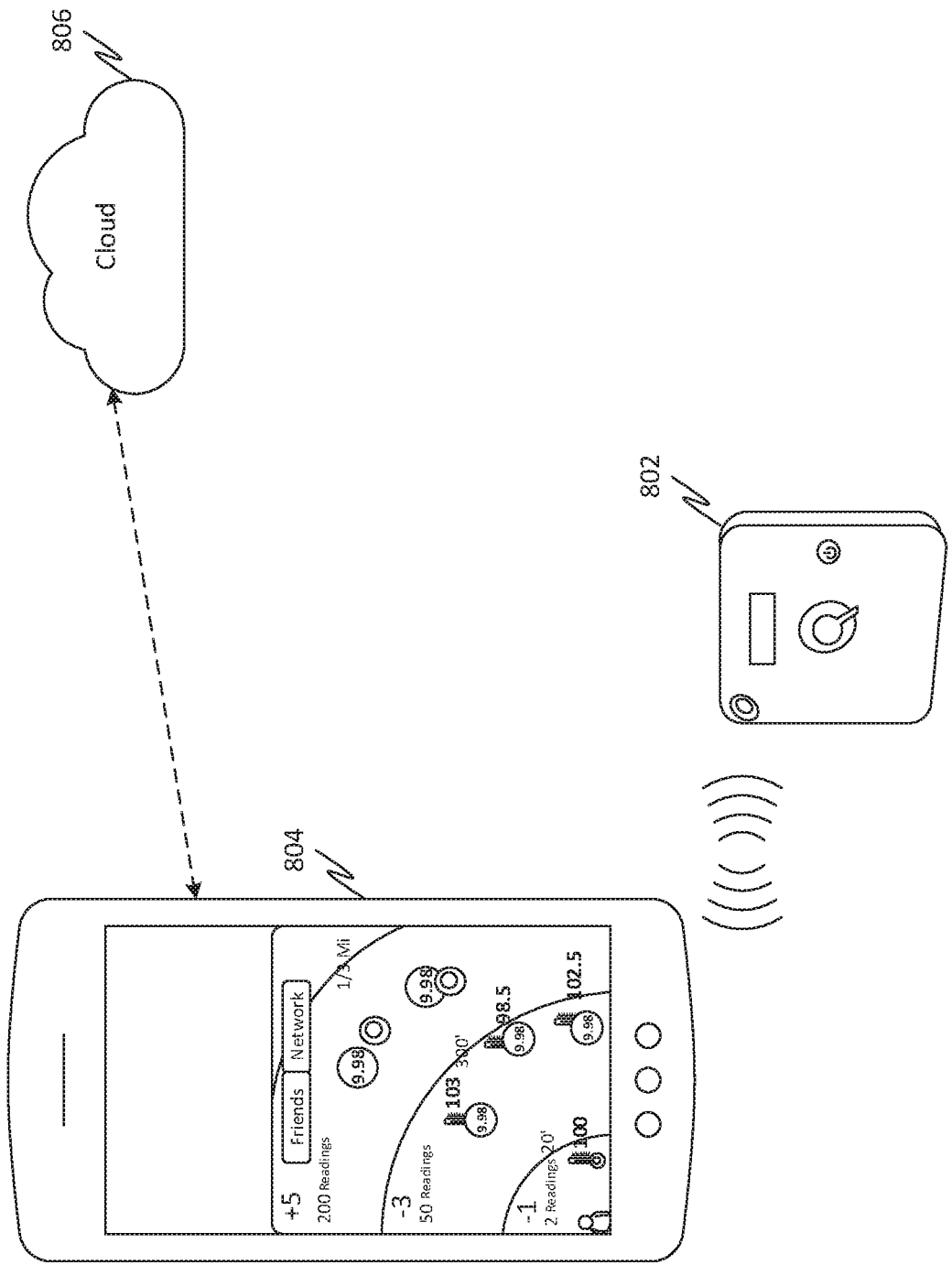
FIG. 8 is schematic showing communication between a locator device, a mobile device and cloud, in accordance with some embodiments.

FIG. 8 is schematic showing communication between a locator device 802 (such as the first locator device 100), a mobile device 804 (such as the mobile device 102) and cloud 806, in accordance with some embodiments.

The locator device 802 may include one or more of optimized NFC driver, advanced BLE network stack, advanced UWB network stack and algorithms, and inertia measurement unit (IMU) and algorithms. Further, the locator device 802 may include one or more of an NFC antenna, a BLE antenna and Dual/Composite UWB antennas.

Further, the locator device 802 may communication with the mobile device 804 via a command and control connection such as BLE UART or another suitable data communication layer.

Further, a software application may be installed on the mobile device 804, wherein the application may be built on the social proximity experience stack. Further, the mobile device 804 may provide one or more APIs including social sonar API, Wayfinding API, Share content API, Virtual meet-up API, Walkie-Talkie API and Content and experience management stack. Further, the software application may employ a Domain-specific Language (DSL).

Further, the mobile device 804 and the cloud 806 may communicate using an analytics and placement stack.

Figure 9:
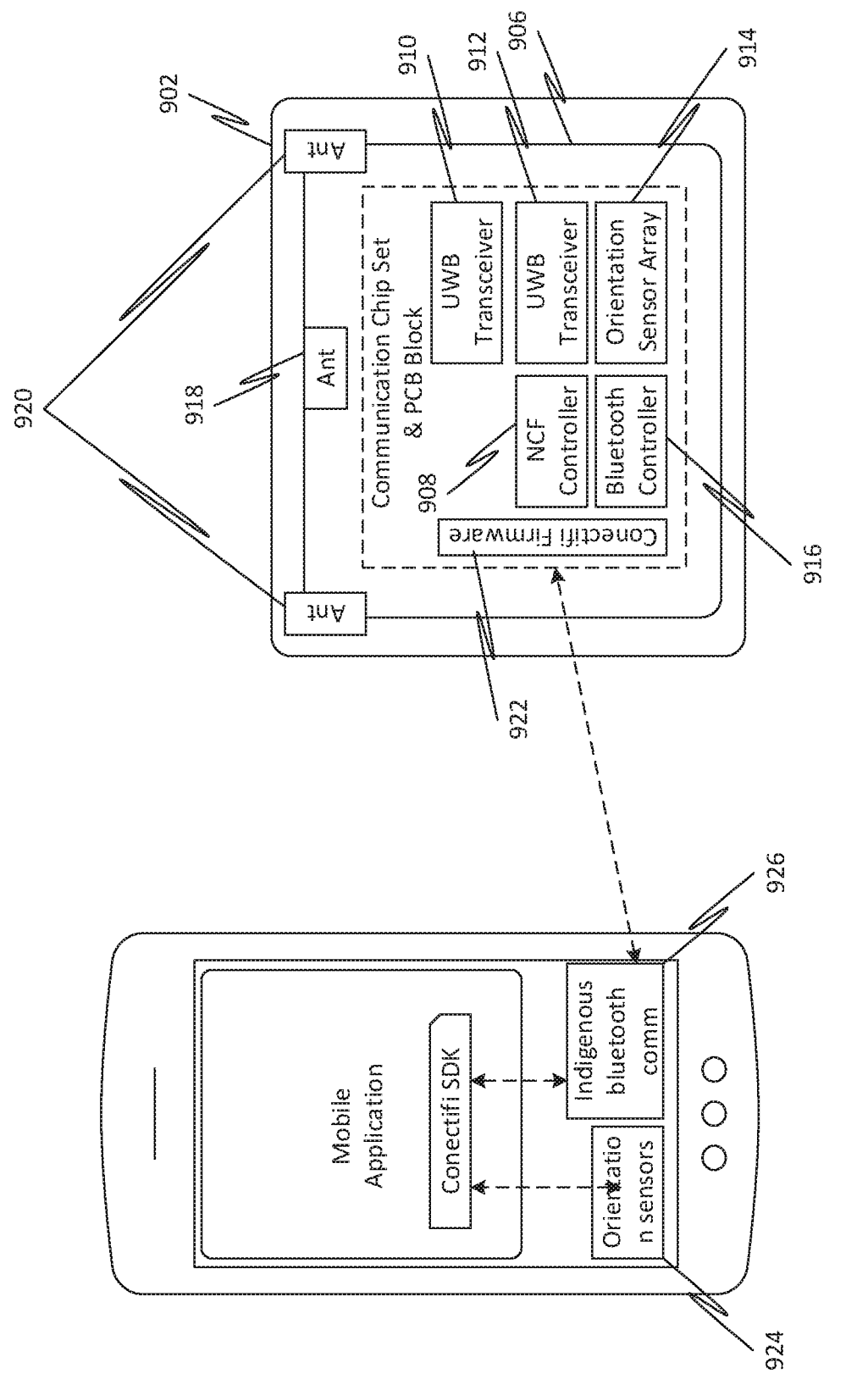
FIG. 9 is schematic showing communication between a locator device and a mobile device, in accordance with some embodiments.

FIG. 9 is schematic showing communication between a locator device 902 (such as the first locator device 100) and a mobile device 904 (such as the mobile device 102), in accordance with some embodiments.

The locator device 902 may include one or more of an NFC antenna 906, an NCF Controller 908, a UWB Transceiver 910, a UWB Transceiver 912, an Orientation Sensor Array 914, Bluetooth Controller 916, a Bluetooth Antenna 918, UWB antennas 920 and Connectifi firmware 922.

Further, a mobile software application may be installed on the mobile device 904. The mobile device 904 may include orientation sensors 924 and an indigenous Bluetooth communication module 926.

Further, the locator device 902 and the mobile device 904 may communicate over a Bluetooth connection.

Figure 10:
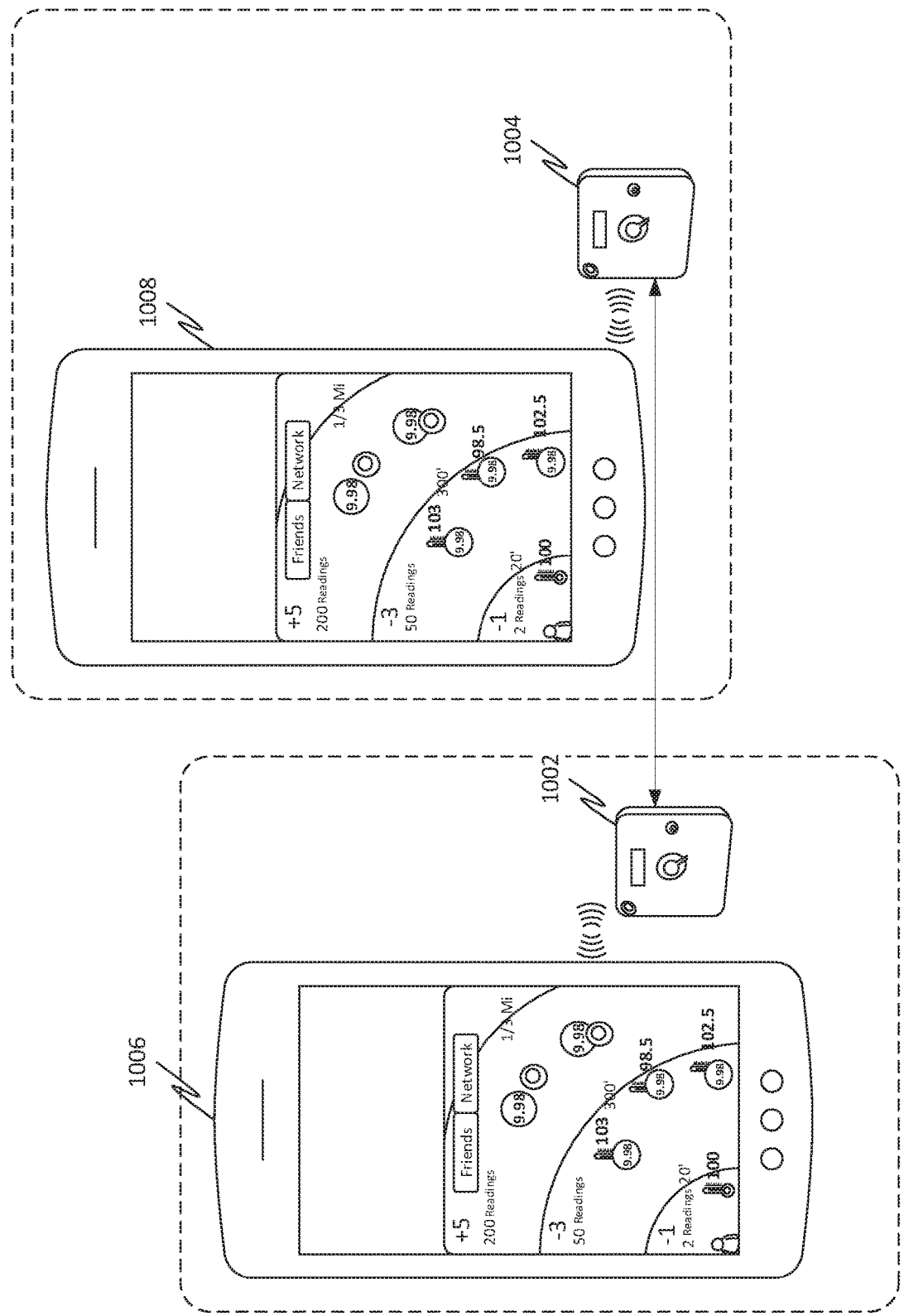
FIG. 10 is schematic showing communication between a locator device, a locator device, a mobile device and a mobile device, in accordance with some embodiments.

FIG. 10 is schematic showing communication between a locator device 1002 (such as the first locator device 100), a locator device 1004 (such as the first locator device 100), a mobile device 1006 (such as the mobile device 102) and a mobile device 1008 (such as the mobile device 102), in accordance with some embodiments.

The locator device 1002 may be affixed with the mobile device 1006. Further, a first user may operate the mobile device 1006. Further, the locator device 1002 may communicate with the mobile device 1006 via a tethered or paired communication (such as BLE UART).

The locator device 1004 may be affixed with the mobile device 1008. Further, a second user may operate the mobile device 1008. Further, the locator device 1004 may communicate with the mobile device 1008 via a tethered or paired communication (such as BLE UART).

Further, each of the locator device 1002 and the locator device 1004 includes 2 DW1000 Transceivers, 2 UWB Antennas, nRF52840 MCU, 1 BLE Antenna, NFC Antenna and a N7150 NXP Controller.

Further, the locator device 1002 may communicate with the locator device 1004 via P2P Communications. The P2P Communications may be carried over NFC, BLE and UWB. NFC may be used for initiation of communication. Further, NDEF (an NFC Forum data format) may be used. Further, BLE may be used for detection, advertising (state change), and transfer (med-speed, long range). Further, UWB may be used for direction finding and transfer (high-speed, mid-range).

Further, the locator device 1002 may perform UWB triangulation for the first user. Further, the locator device 1004 may perform UWB triangulation for the second user.

Figure 11:
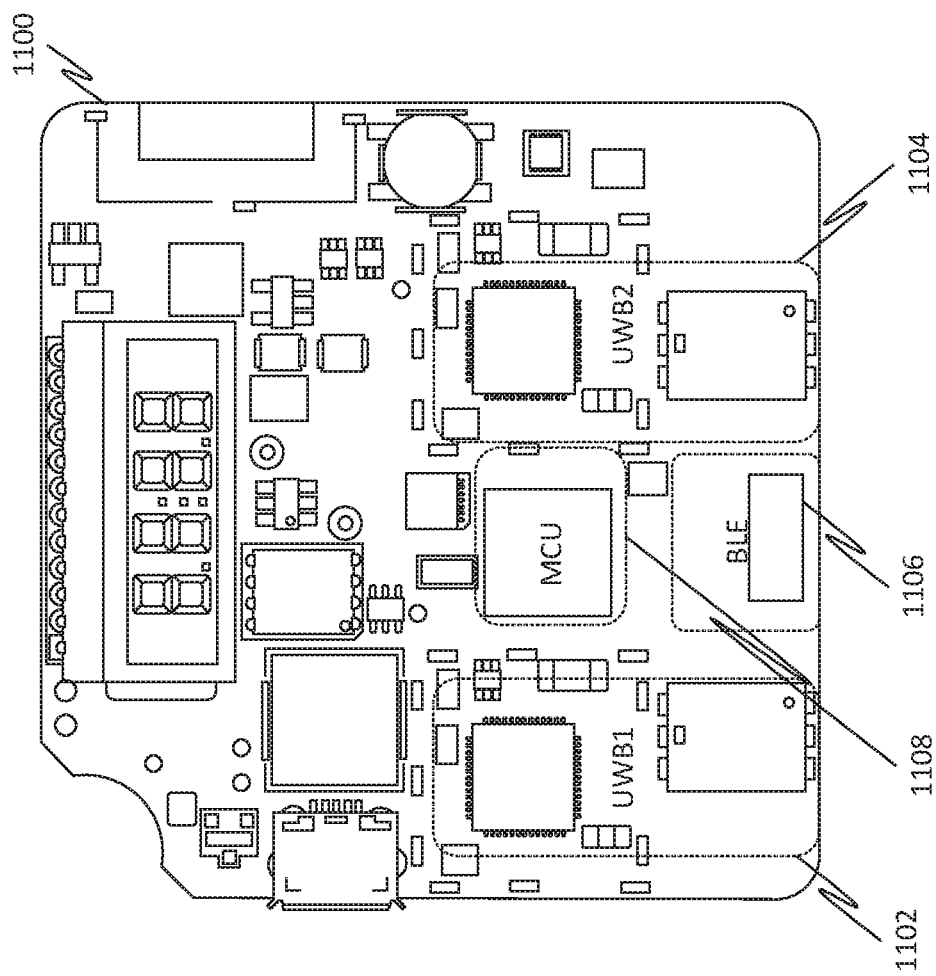
FIG. 11 is a block diagram of hardware of a locator device, in accordance with some embodiments.
Figure 12:
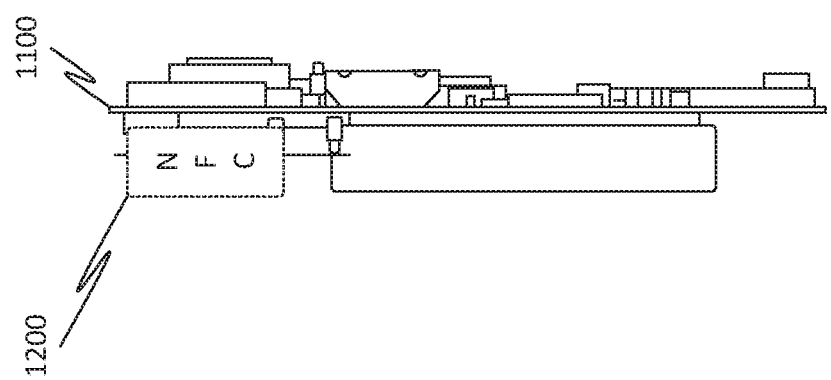
FIG. 12 is a side view of the hardware.

FIG. 11 is a block diagram of hardware 1100 of a locator device (such as the first locator device 100), in accordance with some embodiments. The hardware 1100 may include a UWB module 1102 and a UWB module 1104. Further, the hardware 1100 may include BLE module 1106. Further, the hardware 1100 may include MLE 1108. FIG. 12 is a side view of the hardware 1100. Further, the hardware 1100 may include a NFC module 1200.

Figure 13:
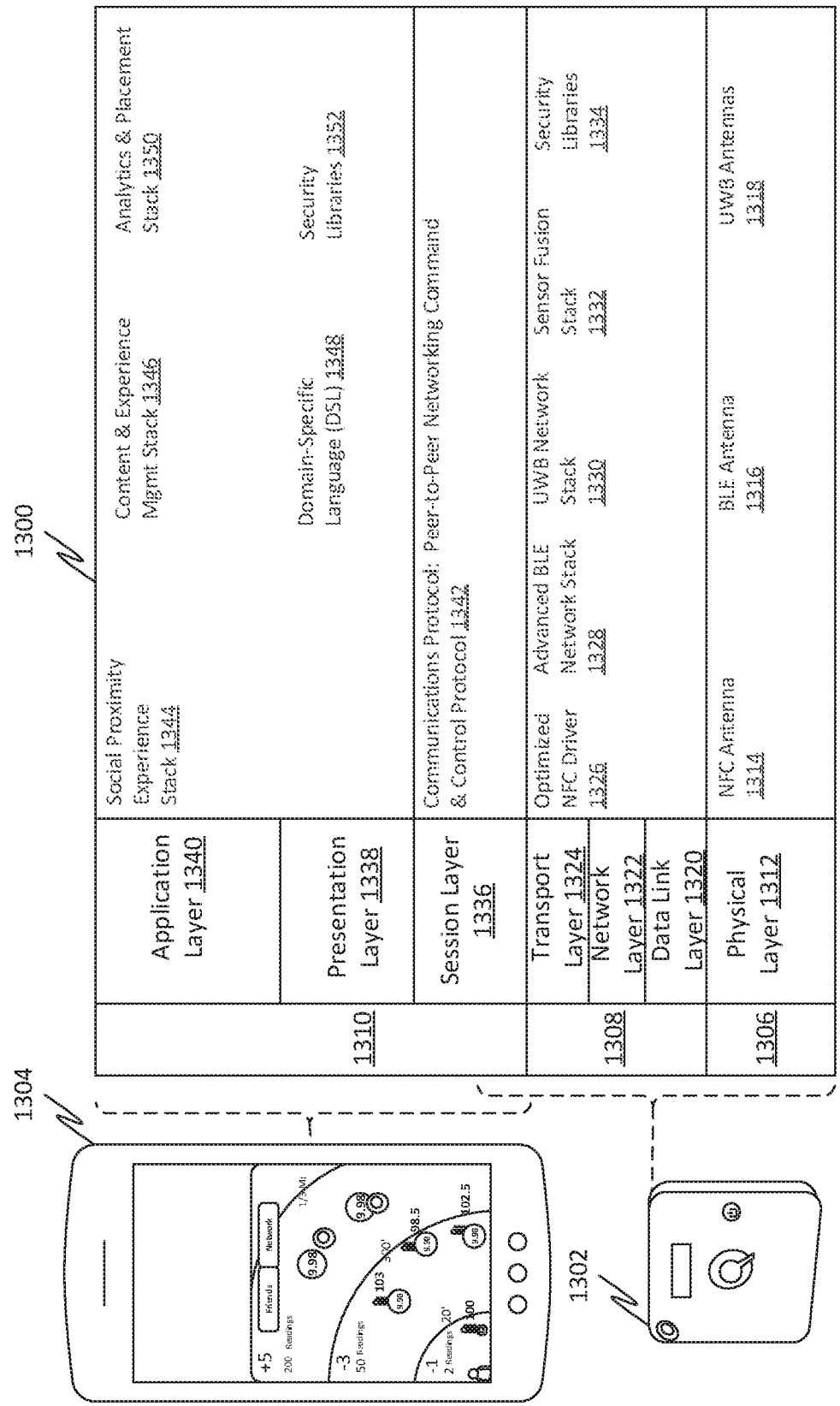
FIG. 13 is a technology stack breakdown for a locator device and a mobile device, in accordance with some embodiments.

FIG. 13 is a technology stack breakdown 1300 for a locator device 1302 (such as the first locator device 100) and a mobile device 1304 (such as the mobile device 102), in accordance with some embodiments.

Further, the technology stack breakdown 1300 may include a hardware layer 1306, a firmware/algorithms layer 1308 and a software/algorithms layer 1310.

Further, the hardware layer 1306 may include a physical layer 1312. The physical layer 1312 may include one or more of an NFC Antenna 1314, a BLE Antenna 1316 and UWB Antennas 1318. Further, the NFC antenna 1314 may have near-field configuration 1-10 cm. Further, the NFC antenna 1314 may be in ultra-small form factor.

Further, the BLE antenna 1316 may be configured for simultaneous NFC and Bluetooth operation. Further, the BLE antenna 1316 may be in ultra-small form factor. Further, the BLE antenna 1316 may be configured for long distance communication.

Further, the UWB antennas 1318 may include dual or more UWB antennas. Further, the UWB antennas 1318 may be connected to UWB transceivers(s). Further, m the UWB antennas 1318 may employ 3D triangulation algorithms.

Further, the firmware/algorithms layer 1306 may include a data link layer 1320, a network layer 1322 and a transport layer 1324.

Further, the firmware/algorithms layer 1306 may include optimized NFC Driver 1326, Advanced BLE Network Stack 1328, UWB Network Stack 1330, Sensor Fusion Stack 1332 and Security Libraries 1334.

Further, the optimized NFC driver 1326 may include two-way data transfer driver. Further, the optimized NFC driver 1326 may include ultra-fast peer-to-peer driver (taps). Further, the optimized NFC driver 1326 may include NFC to BKE network driver integration. Further, the optimized NFC driver 1326 may include custom NFC encryption (security and anti-cloning). Further, the optimized NFC driver 1326 may include NFC tag support (posters, figures).

Further, the advanced BLE network stack 1328 may include battery only/optimized network. Further, the advanced BLE network stack 1328 may have ultra-small form factor/chip operation. Further, the advanced BLE network stack 1328 may be used in hands-free peer-to-peer network set-up/tear-down. Further, the advanced BLE network stack 1328 may enable device synchronization operations. Further, the advanced BLE network stack 1328 may employ compressed data transfer protocol. Further, the advanced BLE network stack 1328 may include 3D triangulation and NFC authentication integrated driver.

Further, the UWB Network Stack 1330 may include 3D triangulation and NFC authentication integrated driver. Further, the UWB Network Stack 1330 may provide Phase Difference of Arrival (PDoA) and Time Difference of Arrival (TDoA) Modes. Further, the UWB Network Stack 1330 may include event state machine to control UWB activation and power consumption. Further, the UWB Network Stack 1330 may enable BLE event and communication and control. Further, the UWB Network Stack 1330 may have ultra-small form factor/chip operation. Further, the UWB Network Stack 1330 may provide device synchronization operations.

Further, the sensor fusion stack 1332 may include IMU drivers and filters. Further, the sensor fusion stack 1332 may include UWB filters. Further, the sensor fusion stack 1332 may include orientation algorithms. Further, the sensor fusion stack 1332 may include composite positioning filters and algorithms.

Further, the security libraries 1334 may include authentication & authorization modules. Further, the security libraries 1334 may include key and security management modules. Further, the security libraries 1334 may include AES encryption modules.

Further, the software/algorithms layer 1310 may include a session layer 1336, a presentation layer 1338 and an application layer 1340.

Further, the session layer 1336 may include the communications protocol: peer-to-peer networking command & control protocol 1342. Further, the communications protocol: peer-to-peer networking command & control protocol 1342 may include command and response protocol, tightly-coupled C&C connection (e.g. BLE UART) and communications state and buffering mechanisms.

Further, the software/algorithms layer 1310 may include one or more of Social Proximity Experience Stack 1344 and Content & Experience Management Stack 1346, Domain-Specific Language (DSL) 1348, Analytics and Placement Stack 1350, and Security Libraries 1352.

Further, the social proximity experience stack 1344 may include social sonar, which may provide real-time location, friend state, social intersect/filter. Further, the social sonar may include sonar Head-Up Display (HUD) (augmented reality integration API).

Further, the social proximity experience stack 1344 may include wayfinding which may include selected friend routing and tracking views.

Further, the social proximity experience stack 1344 may allow for sharing content. This may include detecting & reading tag (unpowered items), detecting and interacting with other Connectifi SDK apps or devices and sharing experience configuration API.

Further, the social proximity experience stack 1344 may include virtual meet-up API which may include detecting and interacting with other Connectifi SDK apps or devices. Further, virtual meet-up API may provide meet-up mechanics and event-handling API. Further, virtual meet-up API may include synchronization API. Further, virtual meet-up API may include configuration API (join time, scenes, #friends, reward, etc.).

Further, the social proximity experience stack 1344 may include walkie-talkie API which may include call set-up & teardown, audio codec and packet & conversation packet management.

Further, the social proximity experience stack 1344 may include spatial awareness/social distancing API which may allow for hyper-fi 3D spatial awareness—triangulation (UWB+sensor fusion), BLE RSSI spatial awareness and hyper-fi local and world mapping.

Further, the Content & Experience Management Stack 1346 may include content management API which may include content encryption and compression API, content rights/rules API and interaction/rules engine API.

Further, the Content & Experience Management Stack 1346 may include experience management API which may include friend/unfriend API, social profile and security API, social filter API and device security and registration API. Further, the Domain-Specific Language (DSL) 1348 may allow for 100× media/payload compression, dynamic content and rule tracking, stateless media rending & transfer and encryption.

Further, the Analytics and Placement Stack 1350 may include event API which may include event subscription API, insight API which may include social graph API and analytics & reporting API. Further, the Analytics and Placement Stack 1350 may include advertising/ad placement API.

Further, the Security Libraries 1352 may include authentication & authorization modules, key & security management modules and AES encryption modules.

According to some embodiments, a system and an algorithm for 3D or more high-precision, mobile, real time device tracking that does not require without requiring installed beacons or cloud, internet or Wi-Fi connection is disclosed.

Further, the software and algorithms provide real-time position triangulation and tracking 3D space.

Further, the software and algorithms provides the real-time combination of a positioning data stream and a Video Data Stream for accurately overlaying/augmenting the video stream with User/Device data.

Further, the system may provide algorithms triangulation based on Bluetooth Direction Finding—including direction, distance, and elevation.

Further, the system may additionally provide unique algorithms for mobile-to-mobile tracking. Since both sensor and target can be, and often will be, moving algorithm provides a measurement and attribution of movement and noise from both the target and sensor to provide a net accurate reading and rendering.

Further, the system may provide software for advanced calibration of communications module-to-mobile Device. For example, different users will attach the external communication module to their mobile phone in different positions and orientation and an accurate calibration of the set-up is instrumental to accurate operation.

Figure 14:
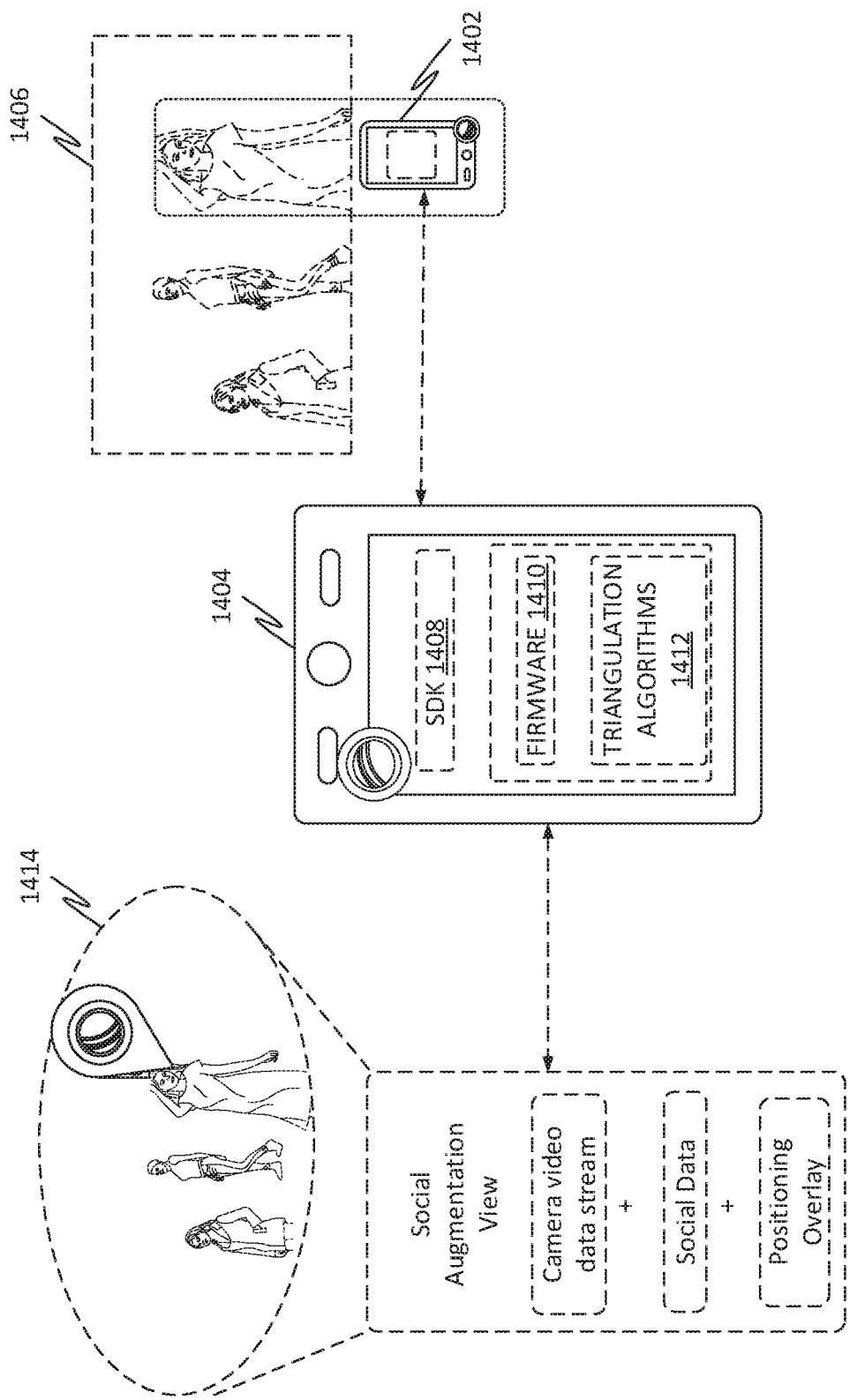
FIG. 14 is a schematic of a system showing the various components that are measured and synthesized to provide an accurate Heads-up Display, in accordance with some embodiments.

FIG. 14 is a schematic of a system showing the various components that are measured and synthesized to provide an accurate Heads-up Display, in accordance with some embodiments.

The system includes a source device 1402 and a target device 1404. The source device 1402 captures and shares visual data steam, signaling data stream and social data related to an event 1406 with the target device 1404.

Further, the target device 1404 includes software and hardware include SDK 1408, firmware 1410 and triangulation algorithms 1412 to process the visual data steam, the signaling data stream and the social data.

Further, the target device 1404 may determine Mobile Device Planer Orientation (orientation, angular position, & attitude). Further, the target device 1404 may send calibration data to a communication module. Further, the communication module may determine planar orientation (orientation angular position, & attitude). Further, the target device 1404 may generate target device positioning data stream Further, the target device 1404 may process the positioning data stream, the visual data steam and the social data to generate a social augmentation view 1414.

Further, the social augmentation view 1414 may include real-time video overlay of position and social data on a video data stream at 3D high precision to make people augmentation a reality. Further, the social augmentation view 1414 may include real-time high-precision video overlay of position data on a video stream based in a peer-to-peer environment (mobile-to-mobile).

The system provides the ability to accurately track & augment in any mobile form factor at 3D high precision that will work anywhere with or without requiring the need for a communication network. There is currently no way to accomplish the preceding. This will enable social applications to continue use once users enter & exit venues; or mobile applications like Uber to safely discover user & driver confirming accurate ride.

According to some embodiments, the system may include Signaling Data Stream Processing (Bluetooth signal processing related to target Device), Visual Data Stream Processing (sensing Device's Mobile Camera), Production of Positioning Data Stream, Measurement & Production of Communications Module Orientation (orientation, angular position, & attitude), Measurement & Production of Mobile Device Orientation (orientation, angular position, & attitude), Measurement and Incorporation of mobile Device (e.g., mobile phone) and Communication Module Calibration data, Social Data stream derived from either the target Device directly or via the sensing Device (target Device's user profile LPGA attribute) and Synthesis of all the above for Video Augmentation, Overlay, and Interaction.

According to some embodiments, a system and an interface delivering 3D or more high-precision, mobile, real time social augmentation & discovery person-to-person are disclosed. The system may employ software processing and interface rendering providing real-time person-level social augmentation.

The system is configured to process video data streams and positioning data streams along with social data to render visual augmentation. For example, visual augmentation may include providing visual "social pin-points" over each individual showing their Social Data's online social profile and/or social intersections. The system may also include facial/person recognition capabilities which is incorporated into the synthesis of the video and position streams to improve usability.

As shown in FIG. 8, the highly precise nature of the positioning, although needed, also provides challenges when target users have their phones in their pockets or elsewhere on their bodies or in a purse. If the social pinpoints are to be rendered above the target person's head, then the system leverages person recognition capabilities in the video stream to attribute the position data to a person (phone in this person's pocket) but rending the social pin-point above the head (determine person's head and render social pin point there).

Figure 15:
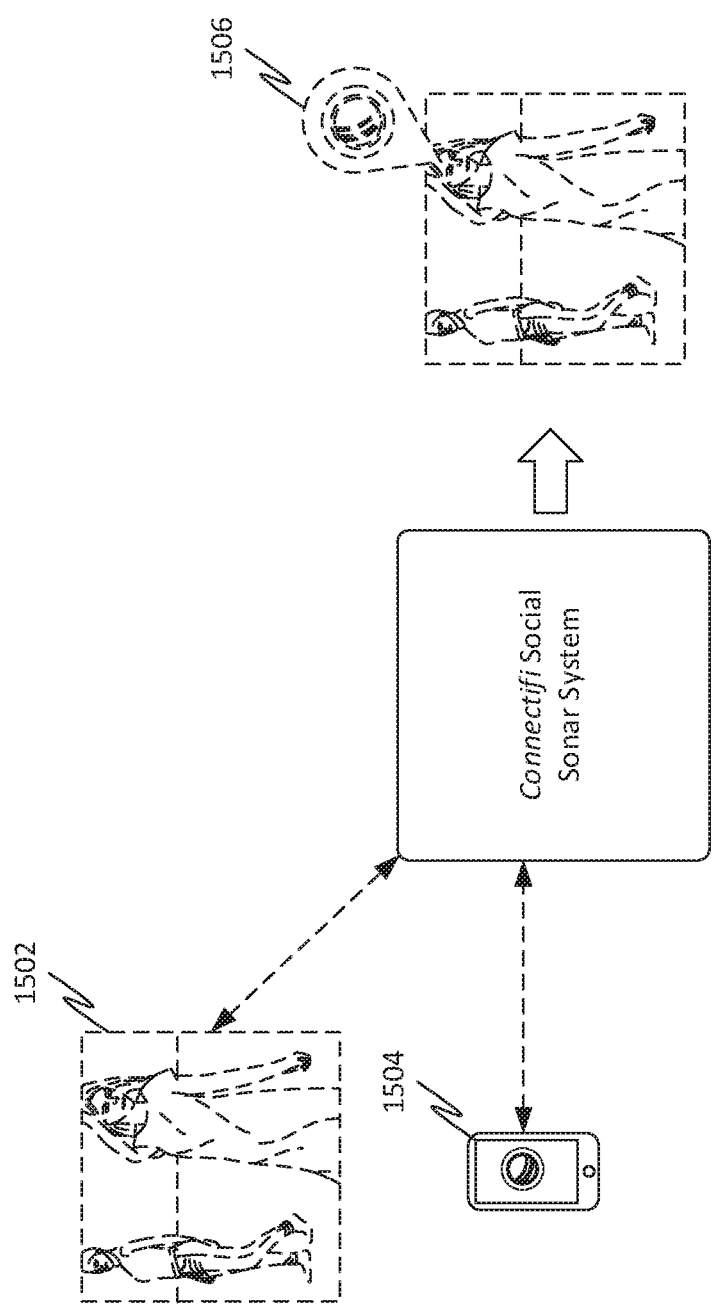
FIG. 15 is a schematic related to a Connectifi Social Sonar System for rendering accurate social pin-point in visual augmented view, in accordance with some embodiments.

FIG. 15 is a schematic related to a Connectifi Social Sonar System 1500 for rendering accurate social pin-point in visual augmented view, in accordance with some embodiments. The Connectifi Social Sonar System 1500 may include receiving video stream data 1502 from a source device of a user and receiving position information from a precise device 1504 placed in back pocket of the user.

Further, the Connectifi Social Sonar System 1500 may be configured to attribute position data to person (synthesize all data streams), determine person head location in video stream and render social pin-point 1506 above person's head.

Further, the Connectifi Social Sonar System 1500 may perform synthesis of video data stream, multiple position data streams, video stream people recognition, augmented overlay, and social data in real-time.

Further, the Connectifi Social Sonar System 1500 may provide effective way to display social data and position data on a video data stream so it is correctly positioned over the appropriate person.

According to some embodiments, a system and an interface for high-precision, mobile, real time via multiple mobile devices is disclosed. The system may be comprised of utilizing multiple invention-enabled devices to perform device tracking and detection.

Further, the system may be configured for reporting of position data of a target device from a second device to other devices in the mesh that other devices can indirectly detect or track the target device.

Further, the system may employ algorithms mesh devices use to synthesize the target device position data from secondary device, along with each particular mesh-device's position data regarding the reporting device to derive position date regarding the target devices position related to the mesh device.

Further, the system may obtain calibration confidence as a measure of the accuracy of a reporting device based on its internal calibration as well as optionally based on that device's historical accuracy based on an assessment of other devices.

Further, the system may perform indirect detection and tracking of target device position based on a mesh/community of devices.

Further, the system may include improved device detect and tracking of target devices based on utilizing additional devices' position data related to the target device.

Further, the "Device" may include a wristband, watch, manufactured device, wearables, phone, tablet, any other programmable electronic device; or, any other device like a figurine, book, trading card or poster that encompasses an RFID-type tag. Further, "Bluetooth" is used for brevity and means Bluetooth and any other Device-to-Device, non-static tower-based, far field communication mechanism. Further, "NFC" is used for brevity and means NFC, RFID, Near Field Magnetic Induction (NFMI) any other near field communication mechanism. Further, "Media" is used for brevity and means images, characters, icons, music, voice audio, text, and any other media forms. Further, "Social Data" is used for brevity and means, but is not limited to, data related to Device end users including self-reported or independently-derived user data, user profile, Device data, location data, online social profile, user-related contextual information (e.g. leaderboard status), and any other social situation data. Further, "Video Data Stream" is used for brevity and means video camera streams, image frame collections, or other types of Media collections. Further, "Composite Antenna" may include an array of multiple antennas designed for coordinated operation. The array may consist of one or more Bluetooth antennas and optionally one or more NFC antennas.

According to some embodiments, systems and methods for high-precision, mobile-to-mobile device tracking and social interaction augmentation are disclosed. Further, a mobile device may provide peer-to-peer or peer-to-many real-time augmentation of people for social interaction that requires no internet or cloud connection and provides 2 cm and 3D precision to locate an end user or device. Further, a hardware and software system for 3D high-precision, mobile, real time peer-to-peer tracking are disclosed.

Further, the system may include software that interacts with communications hardware consisting of a composite antenna and related communications components to provide 3D high-precision tracking.

According to some embodiments, the system allows any mobile device to become a highly precise 3D mobile real-time tracking system of any other mobile devices. The system may provide mobile device users with real-time tracking anywhere without the need for Wi-Fi, internet, installed readers, beacons, or other tracking or processing hardware/software. Further, the users may discover and track other users based anywhere and on an ad hoc basis; as well as discovery of their personal profiles, likes and social media.

Figure 16:
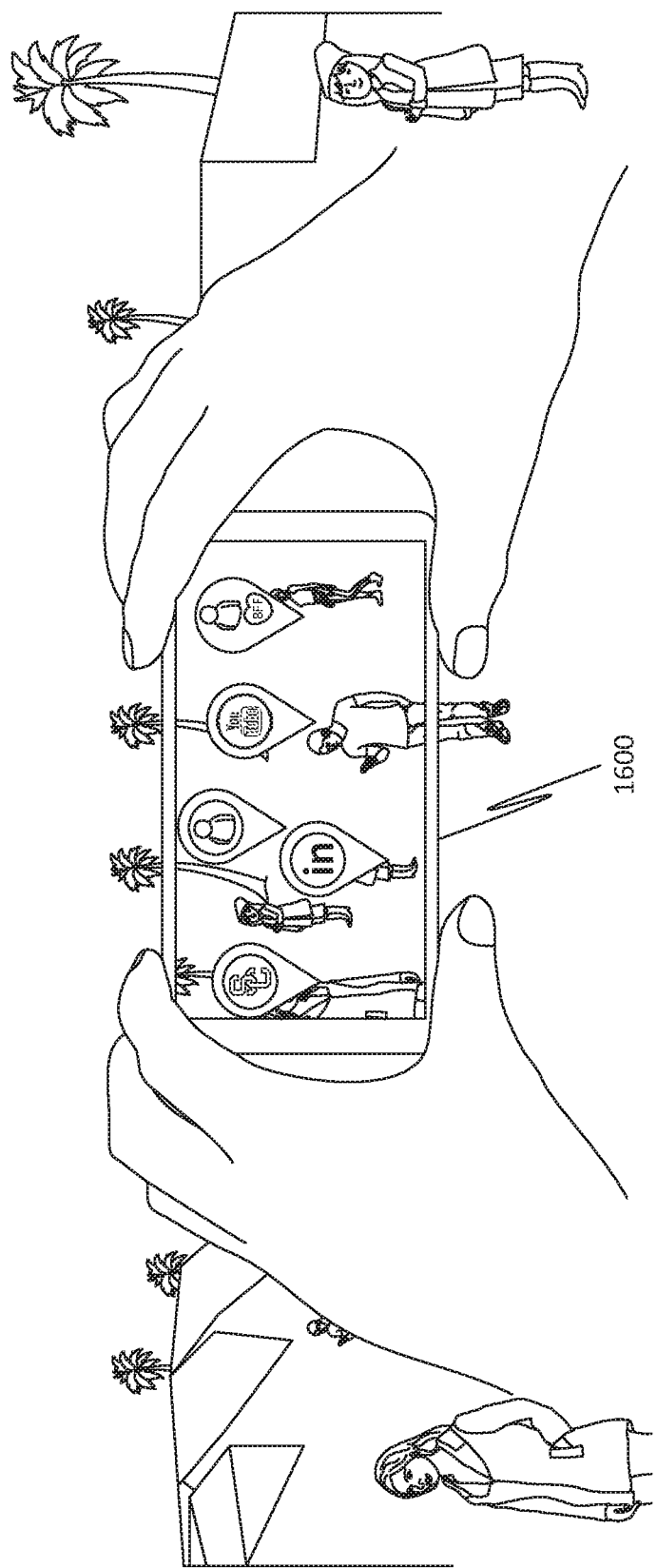
FIG. 16 is a schematic of a mobile device with a tracking application, in accordance with some embodiments.

FIG. 16 is a schematic of a mobile device 1600 with a tracking application, in accordance with some embodiments. The mobile device 1600 may include heads-up display enabling or more users to discover, track and possibly interact with any persons who have opted in and identify other users with similar interests or interests they wish others to know about them (Social Mesh).

Further, the mobile device 1600 may include software embedded within the mobile device 1600. communications hardware consisting of advanced antenna array and signaling hardware to provide real-time peer device detection and tracking with up to 2-centimeter & 3D accuracy.

Figure 17:
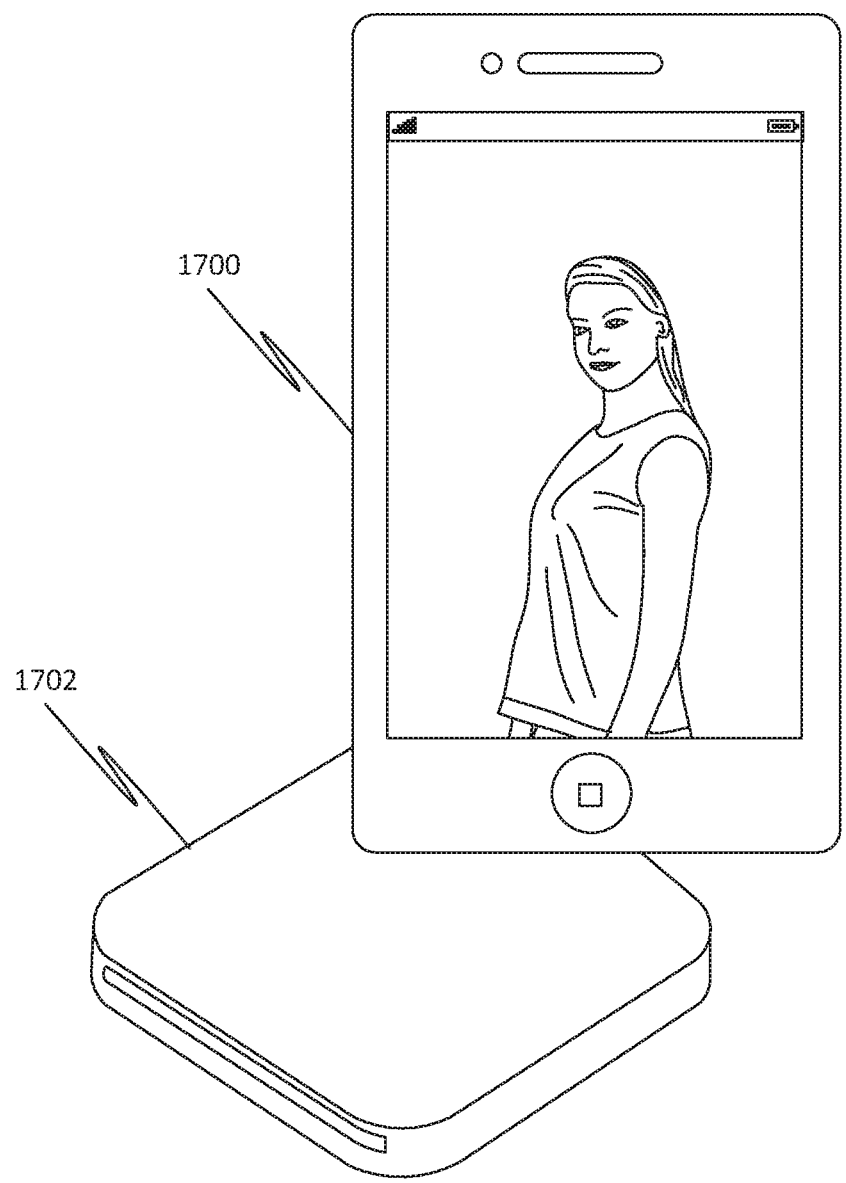
FIG. 17 is a schematic of a mobile device and an external tracking device, in accordance with some embodiments.

FIG. 17 is a schematic of a mobile device 1700 and an external tracking device 1702, in accordance with some embodiments. The external tracking device 1702 may provide accurate position information to the mobile device 1700.

Further, the communications hardware may consist of composite antenna, Bluetooth and NFC antenna, printer circuit board assembly (PCBA) and communications firmware. The composite antenna may consist of multiple Bluetooth antennas arranged based upon form factor, Bluetooth wavelength, and triangulation requirements. For example, for the external tracking device may be a ¾ wavelength (~3 mm) spacing of 4 antennas along each edge of a 6" square device. Additionally, the external tracking device may include one or more array-centrally-located Bluetooth antennas. Further, composite antenna may consist of an NFC antenna along the perimeter of the device with a matching network tuned for a 2-5 cm field generation.

Further, Bluetooth and NFC antenna design and materials may be optimized for mutual non-interference.

Further, the Printer Circuit Board Assembly (PCBA) may contain Bluetooth controller chip, NCF controller chip, Antenna Transceiver/Switch and Orientation/Motion sensor array (e.g. 3-axel Gyro sensor) to capture unit orientation and motion.

Further, the communications firmware may process Bluetooth, NFC, and Orientation/Motion Sensor data; as well as provide communications to the Mobile App SDK/Software or any other mobile device.

Figure 18:
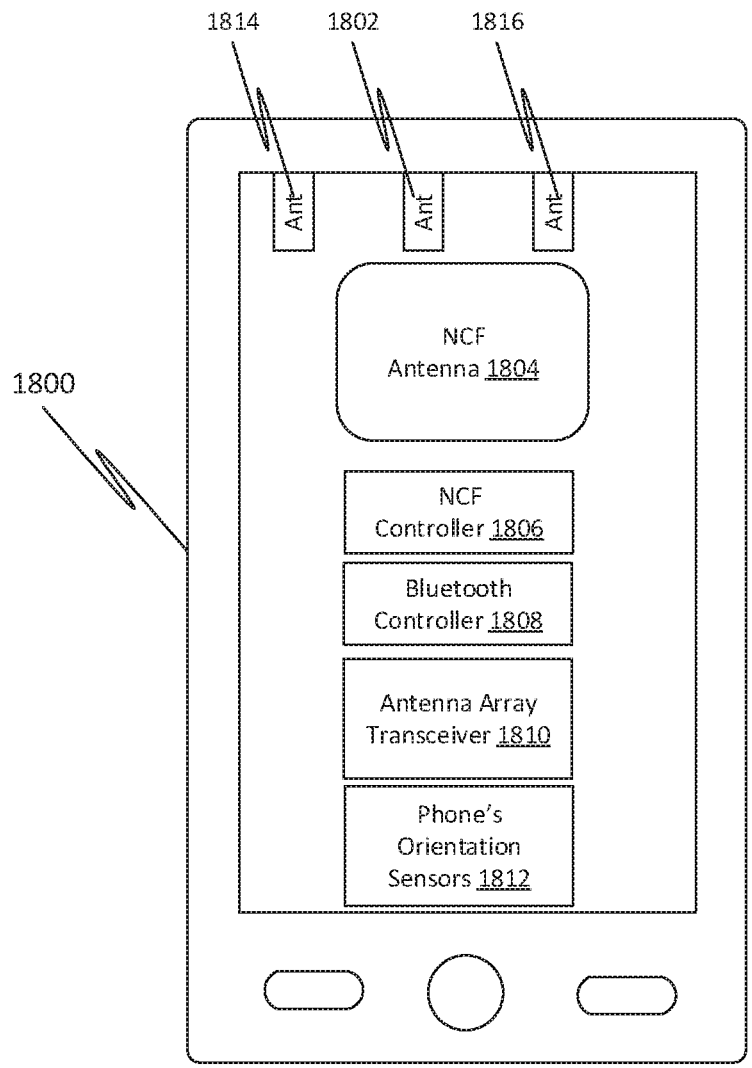
FIG. 18 is a schematic of communications hardware incorporated into a mobile device, in accordance with some embodiments.

Further, the communications hardware may also be implemented as, but not limited to, the communications hardware incorporated into an external tracking device. Further, the communications hardware may be natively incorporated into a mobile device 1800 as shown in FIG. 18. The mobile device 1800 may include a BLE antenna 1802, a plurality of UWB antennae 1814-1816, an NCF Antenna 1804, an NCF Controller 1806, a Bluetooth Controller 1808, an Antenna Array Transceiver 1810 and Phone's Orientation Sensors 1812. Further, the BLE antenna 1802 and the plurality of UWB antennae 1814-1816 may be used for providing consistency/accuracy.

Further, the communications hardware may be incorporated into a protective phone case. Further, the communications hardware may be incorporated into wearables, to include but not limited to, eyewear/glasses. Further, the communications hardware may be incorporated into automotive vehicles to mobile-to-mobile precision tracking and social interaction.

Figure 19:
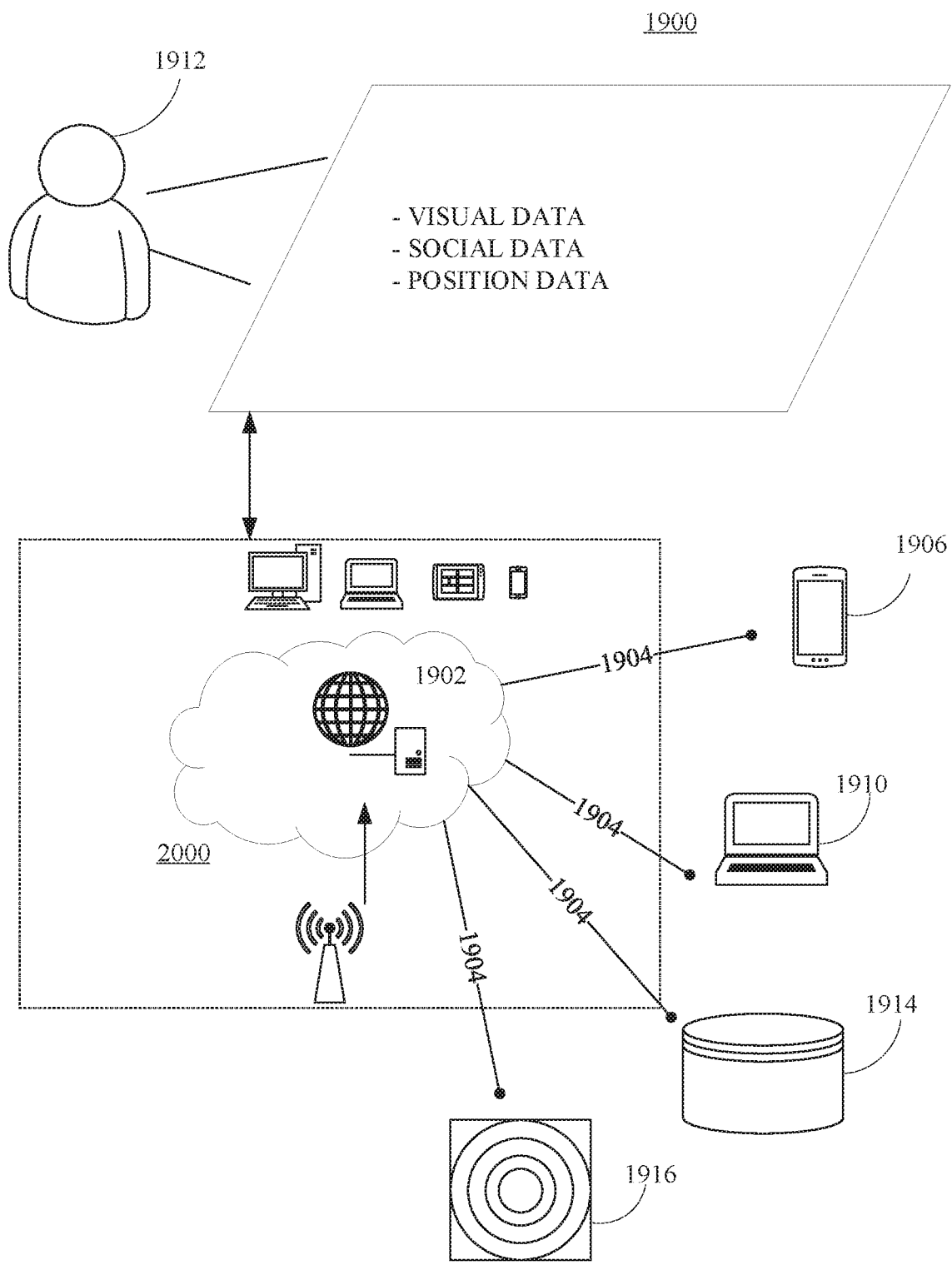
FIG. 19 is an illustration of an online platform consistent with various embodiments of the present disclosure.

FIG. 19 is an illustration of an online platform 1900 consistent with various embodiments of the present disclosure. By way of non-limiting example, the online platform 1900 to facilitate providing a position data to a mobile device may be hosted on a centralized server 1902, such as, for example, a cloud computing service. The centralized server 1902 may communicate with other network entities, such as, for example, a mobile device 1906 (such as a smartphone, a laptop, a tablet computer, etc.), other electronic devices 1910 (such as desktop computers, server computers, etc.), databases 1914, and sensors 1916 over a communication network 1904, such as, but not limited to, the Internet. Further, users of the online platform 1900 may include relevant parties such as, but not limited to, end-users, administrators, and so on. Accordingly, in some instances, electronic devices operated by the one or more relevant parties may be in communication with the platform.

A user 1912, such as the one or more relevant parties, may access online platform 1900 through a web-based software application or browser. The web-based software application may be embodied as, for example, but not be limited to, a website, a web application, a desktop application, and a mobile application compatible with a computing device 2000.

Figure 20:
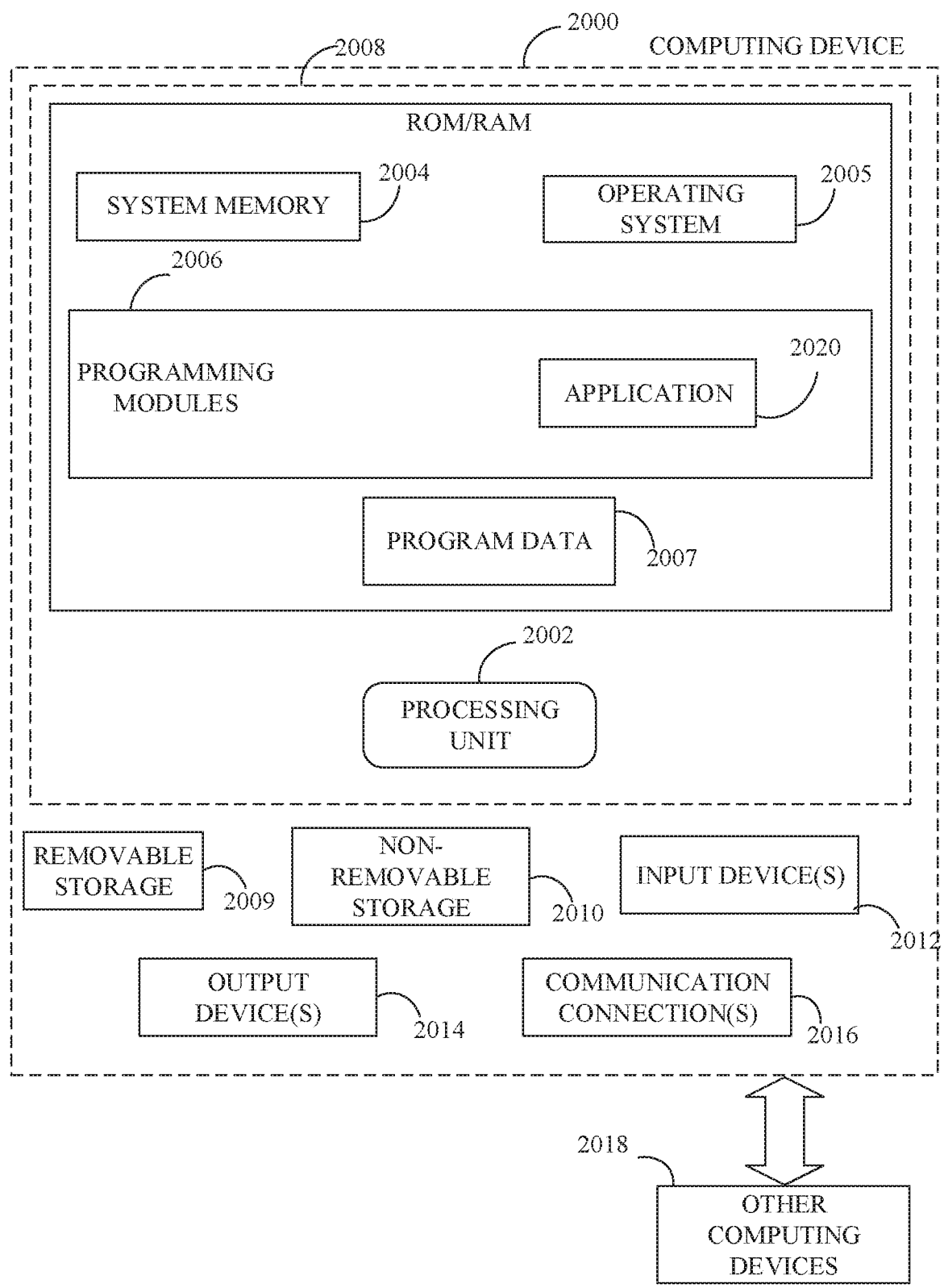
FIG. 20 is a block diagram of a computing device for implementing the methods disclosed herein, in accordance with some embodiments.

With reference to FIG. 20, a system consistent with an embodiment of the disclosure may include a computing device or cloud service, such as computing device 2000. In a basic configuration, computing device 2000 may include at least one processing unit 2002 and a system memory 2004. Depending on the configuration and type of computing device, system memory 2004 may comprise, but is not limited to, volatile (e.g. random-access memory (RAM)), non-volatile (e.g. read-only memory (ROM)), flash memory, or any combination. System memory 2004 may include operating system 2005, one or more programming modules 2006, and may include a program data 2007. Operating system 2005, for example, may be suitable for controlling computing device 2000's operation. In one embodiment, programming modules 2006 may include image-processing module, machine learning module. Furthermore, embodiments of the disclosure may be practiced in conjunction with a graphics library, other operating systems, or any other application program and is not limited to any particular application or system. This basic configuration is illustrated in FIG. 20 by those components within a dashed line 2008.

Computing device 2000 may have additional features or functionality. For example, computing device 2000 may also include additional data storage devices (removable and/or non-removable) such as, for example, magnetic disks, optical disks, or tape. Such additional storage is illustrated in FIG. 20 by a removable storage 2009 and a non-removable storage 2010. Computer storage media may include volatile and non-volatile, removable and non-removable media implemented in any method or technology for storage of information, such as computer-readable instructions, data structures, program modules, or other data. System memory 2004, removable storage 2009, and non-removable storage 2010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2000. Any such computer storage media may be part of device 2000. Computing device 2000 may also have input device(s) 2012 such as a keyboard, a mouse, a pen, a sound input device, a touch input device, a location sensor, a camera, a biometric sensor, etc. Output device(s) 2014 such as a display, speakers, a printer, etc. may also be included. The aforementioned devices are examples and others may be used.

Computing device 2000 may also contain a communication connection 2016 that may allow device 2000 to communicate with other computing devices 2018, such as over a network in a distributed computing environment, for example, an intranet or the Internet. Communication connection 2016 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2004, including operating system 2005. While executing on processing unit 2002, programming modules 2006 (e.g., application 2020 such as a media player) may perform processes including, for example, one or more stages of methods, algorithms, systems, applications, servers, databases as described above. The aforementioned process is an example, and processing unit 2002 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 21:
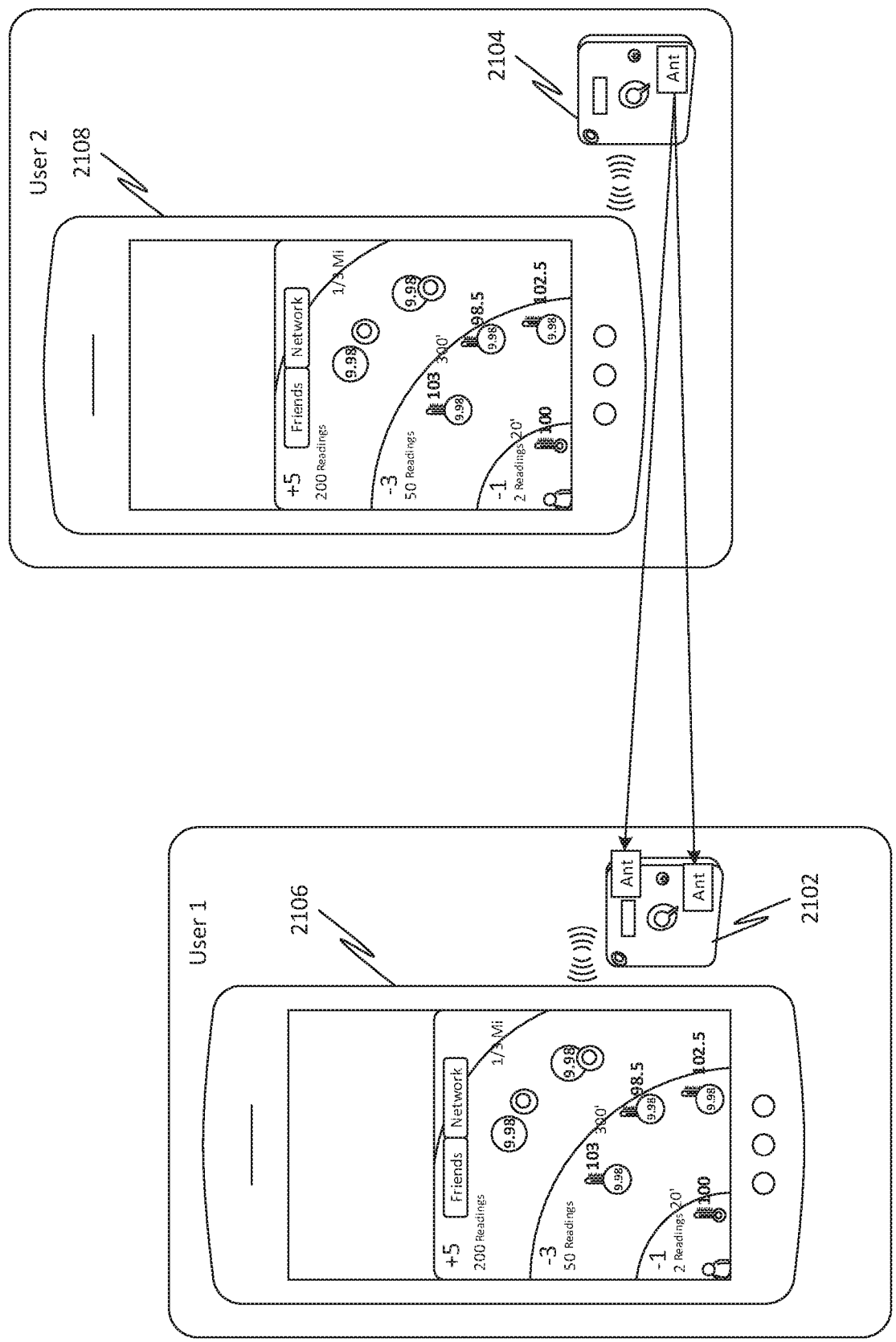
FIG. 21 illustrates a location triangulation (PDoA) between two locator devices, in accordance with some embodiments.

FIG. 21 illustrates a location triangulation (PDoA) between two locator devices, in accordance with some embodiments. Further, the two locator devices may provide the location triangulation on the End-to-End and Peer-to-Peer CoIL basis. Further, the locator devices may include a first locator device 2102 (such as the first locator device 100) and a second locator device 2104 (such as the first locator device 100). Further, a first user device 2106 (such as the mobile device 102) may be associated with the first locator device 2102 and a second user device 2108 (such as the mobile device 102) may be associated with the second locator device 2104. Further, the first locator device 2102 may be affixed with the first user device 2106. Further, a first user may operate the first user device 2106. Further, the first locator device 2102 may communicate with the first user device 2106 via a tethered or paired communication (such as BLE UART). Further, the second locator device 2104 may be affixed with the second user device 2108. Further, a second user may operate the second user device 2108. Further, the second locator device 2104 may communicate with the second user device 2108 via a tethered or paired communication (such as BLE UART). Further, the first locator device 2102 may include at least two antennas. Further, the second locator device 2104 may include at least one antenna. Further, the at least two antennas may include UWB antennas, BLE antennas, NFC antennas, etc. Further, the at least one antenna may include a UWB antenna, a BLE antenna, a NFC antenna, etc. Further, the location triangulation may include a UWB triangulation. Further, the first user device 2106 and the first locator device 2102 may measures the phase arrival difference of RF signals associated with the second user device 2108 and the second locator device 2104 to calculate a triangulated position of the second user device 2108 and the second locator device 2104.

Although the present disclosure has been explained in relation to its preferred embodiment, it is to be understood that many other possible modifications and variations can be made without departing from the spirit and scope of the disclosure.

What is claimed is:

1. A first locator device for providing a position data to a mobile device, the first locator device comprising:
   a first communication transceiver configured to transmit an outgoing data to the mobile device and receive an incoming data from the mobile device, wherein the outgoing data comprises the position data;
   a first location transceiver comprising:
      a first array of antennae configured to intercept incoming radio frequency waves transmitted by at least one second locator device and emanate outgoing radio frequency waves based on a plurality of outgoing radio frequency signal data;
      a first plurality of location receivers electrically coupled to the first array of antennae, wherein the first plurality of location receivers is configured to generate a plurality of incoming radio frequency signal data based on interception of the radio frequency waves;
      a first plurality of location transmitters electrically coupled to the first array of antennae, wherein the first plurality of location transmitters is configured to generate the plurality of outgoing radio frequency signal data;
      a first orientation sensor configured to generate a first orientation data corresponding to the first locator device;
      a first location processor communicatively coupled to each of the first plurality of location receivers, the first plurality of location transceivers and the first orientation sensor, wherein the first location processor is configured to:
         generate the plurality of outgoing radio frequency signal data;
         generate the position data based on the plurality of incoming radio frequency signal data and the orientation data, wherein the position data is in relation to the at least one second locator device; and
   a first power source to provide electrical energy to each of the first communication transceiver and the first location transceiver.

2. The first locator device of claim 1, wherein the first communication transceiver comprises a short range communication transceiver.

3. The first locator device of claim 2, wherein the short range communication transceiver is configured to operate in accordance with a Bluetooth standard.

4. The first locator device of claim 2, wherein the short range communication transceiver comprises a Near-Field-Communication (NFC) transceiver.

5. The first locator device of claim 1, wherein the first location transceiver comprises a short range communication transceiver.

6. The first locator device of claim 5, wherein the short range communication is configured to operate in accordance with Bluetooth standard v5.1.

7. The first locator device of claim 1 further comprises a Near-Field-Communication (NFC) transceiver, wherein each of the first communication transceiver and the NFC transceiver is configured to operate synchronously.

8. The first locator device of claim 1, wherein the first location transceiver comprises a first Ultra-Wideband (UWB) transceiver, wherein the first array of antennae comprises a plurality of UWB antennae and the first plurality of location receivers comprises a plurality of UWB receivers.

9. The first locator device of claim 1, wherein the first array of antennae is disposed in a predetermined spatial arrangement configured to facilitate generation of the position data based on at least one of triangulation and trilateration of the plurality of incoming radio frequency signal data.

10. The first locator device of claim 9, wherein a first antenna of the first array of antennae is disposed at a first spatial position in relation to a reference point on the first locator device, wherein a second antenna of the first array of the antennae is disposed at a second spatial position in relation to the reference point, wherein a spatial distance between the first spatial position and the second spatial position is at least 3 mm.

11. The first locator device of claim 9, wherein the first location transceiver further comprises at least one inertial-sensor configured to generate an inertial data based on at least one of a motion and an orientation of the first locator device, wherein the at least one inertial sensor is communicatively coupled to the first location processor, wherein the first location processor is further configured to generate the position data based further on the inertial data.

12. The first locator device of claim 9, wherein the first location processor is further configured to:
   analyze the inertial data;
   determine a predetermined movement based on the analysis;
   generate an inertial offset data based on determining the predetermined movement, wherein the generating of the position data is further based on the inertial offset data.

13. The first locator device of claim 12 further comprising:
   a housing configured to house each of the first communication transceiver, the first location transceiver and the first power source; and
   a fastener configured to fasten the first locator device onto a wearable device of a user.

14. The first locator device of claim 13, wherein the wearable device comprises at least one of a wristband, a garment, an accessory, a foot wear, a facemask and an eyewear.

15. The first locator device of claim 1 further comprising:
   a housing configured to house each of the first communication transceiver, the first location transceiver and the first power source, wherein the housing is characterized by a cuboidal shape;
   a fastener attached to an exterior surface of the housing, wherein the fastener is configured to fasten the first locator device to a rear surface of the mobile device.

16. The first locator device of claim 15, wherein the fastener comprises a magnetic material configured to attract a metallic portion comprised in the mobile device.

17. The first locator device of claim 15, wherein the fastener comprises a layer of a releasable adhesive.

18. The first locator device of claim 15, wherein the fastener comprises a double sided adhesive layer, wherein a first side of the double sided adhesive layer comprises a first layer of adhesive configured to adhere to the exterior surface of the housing, wherein the second side of the double sided adhesive layer comprises a second layer of adhesive configured to adhere to the rear surface of the mobile device.

19. The first locator device of claim 1 comprising a case characterized according to a form factor of the mobile device, wherein the case is configured to be secured onto the mobile device, wherein the case comprises:

a back panel comprising an exterior side and an interior side;

at least three side panels, wherein each side panel is attached to a boundary of the back panel and extends away from the interior side forming a cavity configured to receive the mobile device.

20. The first locator device of claim 1 further comprising at least one of a display device and an audio device, wherein the display device is configured to generate a visual display based on a display data, wherein the audio device is configured to generate acoustic waves based on an audio data, wherein at least one of the display device and the audio device is communicatively coupled to the first location processor, wherein the first location processor is configured to:

analyze the position data; and generate at least one of the display data and the audio data based on analysis of the position data.

21. The first locator device of claim 1, wherein the first location processor is configured to generate the position data based on at least one of triangulation and trilateration of the plurality of incoming radio frequency signal data.

22. The first locator device of claim 1, wherein the first location processor is configured to generate the position data based on at least one of Time Difference of Arrival (TDoA) and Phase Difference of Arrival (PDoA) corresponding to the plurality of incoming radio frequency signal data.

* * * * *